US 6,693,541 B2

(12) United States Patent
Egbert

(10) Patent No.: US 6,693,541 B2
(45) Date of Patent: Feb. 17, 2004

(54) RFID TAG WITH BRIDGE CIRCUIT ASSEMBLY AND METHODS OF USE

(76) Inventor: William C. Egbert, P.O. Box 33427, St. Paul, MN (US) 55133-3427

( * ) Notice: Subject to any disclaimer, the term of this patent is extended or adjusted under 35 U.S.C. 154(b) by 284 days.

(21) Appl. No.: 09/909,154

(22) Filed: Jul. 19, 2001

(65) Prior Publication Data

US 2003/0016133 A1 Jan. 23, 2003

(51) Int. Cl.[7] .............................................. G08B 13/14
(52) U.S. Cl. .............................. 340/572.7; 340/572.5; 340/572.8; 361/821; 29/601; 343/750; 343/895; 235/492
(58) Field of Search ........................... 340/572.7, 572.8, 340/572.1, 572.5; 361/813, 600, 821; 257/288, 528, 529, 531, 532; 29/25.42, 601; 343/895, 700 R, 750; 235/487, 442, 449, 451, 444, 492, 493

(56) References Cited

U.S. PATENT DOCUMENTS

| | | | |
|---|---|---|---|
| 4,142,674 A | | 3/1979 | Walton ........................ 235/442 |
| 4,369,557 A | | 1/1983 | Vandebult ................... 29/25.42 |
| 4,658,264 A | | 4/1987 | Baker .......................... 343/895 |
| 4,694,283 A | | 9/1987 | Reeb ........................ 340/572.5 |
| 4,792,790 A | | 12/1988 | Reeb ........................ 340/572.5 |
| 4,876,555 A | * | 10/1989 | Jorgensen ................... 343/895 |
| 5,276,431 A | * | 1/1994 | Piccoli et al. ............. 340/572.5 |
| 5,291,180 A | | 3/1994 | Reeb ........................ 340/572.5 |
| 5,420,757 A | | 5/1995 | Eberhardt et al. .......... 361/813 |
| 5,442,334 A | * | 8/1995 | Gallo et al. ............... 340/572.3 |
| 5,528,222 A | | 6/1996 | Moskowitz et al. ...... 340/572.7 |
| 5,541,399 A | * | 7/1996 | de Vall ........................ 235/491 |
| 5,574,470 A | * | 11/1996 | de Vall ........................ 343/895 |
| 5,608,246 A | | 3/1997 | Yeager et al. ................ 257/295 |
| 5,608,417 A | * | 3/1997 | de Vall ........................ 343/895 |
| 5,695,860 A | * | 12/1997 | Imaichi et al. .............. 428/209 |

(List continued on next page.)

FOREIGN PATENT DOCUMENTS

| | | |
|---|---|---|
| DE | 196 33 923 | 2/1998 |
| EP | 0 704 816 | 4/1996 |
| EP | 0 737 935 A2 | 10/1996 |
| EP | 0 821 406 | 1/1998 |
| EP | 1 014 302 | 6/2000 |
| FR | 2 803 439 | 7/2001 |
| JP | 07-45441 | 2/1995 |
| JP | 08-44964 | 2/1996 |
| JP | 10-92690 | 4/1998 |
| WO | WO 97/14112 | 4/1997 |
| WO | WO 99/46744 | 10/1999 |
| WO | WO 99/65002 | 12/1999 |
| WO | WO 99/67754 | 12/1999 |
| WO | WO 00/16279 | 3/2000 |

Primary Examiner—Benjamin C. Lee
(74) Attorney, Agent, or Firm—Melissa E. Buss

(57) ABSTRACT

Radio frequency identification tag devices with bridge circuit assemblies and methods for high-volume, low-cost production are disclosed. The bridge circuit assemblies and methods of the present invention can reduce the complexity of the RFID tag devices by providing a one-sided circuit design. The resonant frequency of the circuits formed on the devices may be tuned by severing selected connections to one or more tuning capacitor plates that form a part of the capacitor structure. Severing connections to the tuning capacitor plates changes the capacitance of the circuit that, in turn, changes the resonant frequency of the circuit. Further, the devices and methods of the present invention allow for the option of placing a die either on the antenna substrate or on the bridge circuit assembly.

61 Claims, 9 Drawing Sheets

U.S. PATENT DOCUMENTS

| | | | | |
|---|---|---|---|---|
| 5,734,327 | A | * | 3/1998 | Batterink et al. ......... 340/572.5 |
| 5,754,110 | A | * | 5/1998 | Appalucci et al. ....... 340/572.5 |
| 5,841,350 | A | * | 11/1998 | Appalucci et al. ....... 360/572.3 |
| 5,909,050 | A | * | 6/1999 | Furey et al. ................. 257/531 |
| 5,973,600 | A | * | 10/1999 | Mosher, Jr. .............. 340/572.8 |
| 6,018,299 | A | | 1/2000 | Eberhardt ................. 340/572.7 |
| 6,087,940 | A | * | 7/2000 | Caperna et al. .......... 340/572.5 |
| 6,088,230 | A | * | 7/2000 | Finn et al. .................. 361/737 |
| 6,091,332 | A | | 7/2000 | Eberhardt et al. ....... 340/572.1 |
| 6,091,607 | A | * | 7/2000 | McKeown et al. ......... 361/777 |
| 6,133,834 | A | * | 10/2000 | Eberth et al. ............. 340/572.5 |
| 6,160,526 | A | * | 12/2000 | Hirai et al. .................. 343/895 |
| 6,304,169 | B1 | * | 10/2001 | Blama et al. ............... 340/10.1 |
| 6,313,747 | B2 | * | 11/2001 | Imaichi et al. ............ 340/572.5 |
| 6,400,323 | B2 | * | 6/2002 | Yasukawa et al. ... 343/700 MS |
| 6,407,669 | B1 | | 6/2002 | Brown et al. ............. 340/572.1 |
| 6,421,013 | B1 | * | 7/2002 | Chung ................. 343/700 MS |
| 6,424,263 | B1 | * | 7/2002 | Lee et al. ................. 340/572.7 |
| 6,437,985 | B1 | * | 8/2002 | Blanc et al. .................. 361/749 |
| 6,476,775 | B1 | * | 11/2002 | Oberle ....................... 343/895 |

* cited by examiner

RFID TAG WITH BRIDGE CIRCUIT ASSEMBLY AND METHODS OF USE

FIELD OF THE INVENTION

The present invention relates generally to Radio Frequency Identification (RFID) Tags with bridge circuit assemblies and the methods of producing such tags.

BACKGROUND

The design of a typical RFID tag reflects its origin in the semiconductor and printed circuit board industries. Although functional, the design has a number of features that increase the cost of the finished article. In a resonant RFID tag, the electrical inductance of an antenna is connected in parallel with a capacitor such that the resonant frequency of the thus-formed circuit is tuned to a prescribed value. In more advanced forms, the circuit of the RFID tag may include an integrated circuit die electrically and mechanically bonded to the antenna on a substrate, wherein the voltage induced in/on the antenna by a reader signal provides power to operate the integrated circuit on the die.

The antenna typically includes a metal coil pattern on one side of a substrate, and metallization on the second side of the substrate to cross over the antenna, i.e., bring the outer connection of the multi-turn antenna coil back to the open unpatterned area in the center, where the die is typically located and bonded. Vias, i.e., electrical connections through the substrate, connect the first side metallization to the second side metallization. Typically one connection is made at the outer perimeter of the antenna to the second side metallization, and a second connection interior to the antenna coil brings the second side metallization in contact with the die bonding pad on the first (coil) side metallization.

The die is bonded between the antenna and second side metallization such that it completes the circuit between the ends of the antenna. The antenna center frequency is often tuned by laser-trimming the area of a capacitor plate formed between the first surface and second surface metallization.

Several problems exist with the current method of manufacturing RFID tags. For example, because metallization is formed on both the front and back sides of the substrate, alignment between the two sides is crucial. Aligning the two sides presents challenges that are difficult to overcome and are costly. In addition, where the front side to back side alignment is not accurate, fabrication yield can be reduced.

Further, while the antenna and cross-over metallization Design Rules may be relaxed with large features and wide tolerances, the die-attach region requires tight tolerances on physical dimensions to match the relatively small pads on the die. Therefore, the antenna Design Rules, e.g., line width, line form, pad size and placement, space between features, etc., must meet the stricter requirements for the die bonding area with its small bonding pad features, thereby increasing the cost for the entire construction because of the special requirements in the one small bonding area. Alternatively, the die can be made to be very large—and therefore expensive—to meet the Design Rules and tolerances of the much larger antenna.

In addition, the material requirements of the die bonding process constrain the antenna substrate choices to those materials that are compatible with the die bonding process. This has the effect of increasing the cost, because the antenna could be made on inexpensive, but "low performance" substrates, except that the die bonding process may require a substrate that can withstand a moderate amount of heat, pressure, and/or process chemistry.

SUMMARY OF THE INVENTION

The present invention provides radio frequency identification (RFID) tag devices with bridge circuit assemblies and methods for high-volume, low-cost production. The construction of the devices and methods of the present invention presents a number of advantages over the prior art. For example, the present invention reduces the complexity of the typical two-sided RFID tag with through-substrate via connections by providing a one-sided circuit design. This obviates the need for patterned through-substrate via connections, while also addressing front side to back side alignment issues.

Another advantage of the devices and methods of the present invention is that the resonant frequency of circuits formed on the RFID tag devices of the present invention may be tuned by severing selected connections to one or more tuning capacitor plates that form a part of the capacitor structure. Severing connections to the tuning capacitor plates changes the capacitance of the circuit which, in turn, changes the resonant frequency of the circuit.

This invention may also reduce the number of connections in the RFID tag. The reduced number of connections may improve initial reliability and manufacturing process yield. In addition, fewer connections may also limit the sites of potential failure due to long-term aging conditions.

The devices and methods of the invention can be used to manufacture RFID tag devices that do not include an integrated circuit die for use as Electronic Article Surveillance (EAS) devices. Such devices may be deactivated by methods known in the art, such as exposing the device to a high intensity electromagnetic field at the resonance frequency. The large voltage induced in the circuit on the device may drive a current through any conductive medium used to join the circuit at the connection pads that is large enough to destroy the required electrical interconnection. Alternatively, the large voltage induced in the circuit may cause a conductive channel to form in the dielectric layer of the capacitor, thus destroying or changing the capacitance of the circuit. After deactivation, the device will no longer significantly interact with the electromagnetic field at the operating frequency of the inquiring system. Conversely, if the device is not deactivated, it will interact with a sensing field to indicate that an article is being removed from a controlled area.

In some embodiments of the present invention, an integrated circuit die may be attached to a die connection site that forms a part of the circuit, thus forming an RFID tag device including additional functions or features, e.g., memory, etc. The die connection site may be located either on the antenna substrate or on the bridge circuit assembly. The die connection site may, in some embodiments, include die connection terminals that are made by separating an integrated die connection pad before attaching the die. If desired, the deactivation methods described above may also be used to deactivate RFID tag devices that incorporate an integrated circuit die.

When the die is located on the antenna substrate, higher density Design Rules, i.e., the form and size of allowable lines, features, spaces between adjacent features, may be required on the antenna to accommodate the small features on the die, but then the bridge can be as simple as a piece of metal foil or metallized film substrate with no further patterning. The advantage of this approach is simplicity of the bridge design, and the choice between die-on-bridge vs. die on antenna substrate can be determined by the overall product cost. This invention has the flexibility to allow the user to place the die where it will be least expensive for the total system cost and optimize the design based on the total system cost with a minimum of design constraints.

The circuit patterns may be formed on a continuous web that can be separated to provide a number of individual RFID tag devices. The circuit patterns could be complete prior to separation of the web, or the circuit patterns could be partially formed, separated from the web, and then completed. Alternatively, a die could be attached at the die connection site either before or after the web is separated into the individual RFID tag devices.

Further, the modular construction of an antenna substrate and separate bridge circuit allows sub-optimization of each subsystem independently. For example, the antenna substrate may be fabricated using coarse Design Rules for high process yield, using inexpensive processes and materials. The separately constructed bridge can be fabricated using high density Design Rules, allowing the size of the attached RFID die to shrink significantly. The bridge can be fabricated using more tightly toleranced—and therefore more expensive-manufacturing, but the bridge circuit is a small fraction of the total area of the completed RFID tag, and the absolute cost of the bridge will be relatively low. The cost of making a small bridge with high density Design Rules may be lower than the cost of making the entire antenna using high density Design Rules. For example, the substrates and metallization for each element, bridge and antenna, can be independently optimized to reduce cost while providing acceptable throughput and/or reliability.

The bridge circuit assembly also offers an easy way to make a tuning capacitor by supplying one of the two plates needed to form the capacitor. The antenna substrate provides the second capacitor plate. The plurality of tuning capacitor plates allows selective tuning by excision of one or more capacitor plate connections to optimize the electrical performance of the device.

In one aspect, the present invention provides a method for fabricating a radio frequency identification tag device by providing a base substrate including first and second major surfaces; providing a circuit pattern on the first major surface of the base substrate including an antenna pattern including first and second ends and a plurality of coils, wherein the first end of the antenna pattern is located within an inner space defined by the plurality of coils and the second end of the antenna pattern is located outside of the plurality of coils, a first connection pad and a second connection pad, wherein the first connection pad is in electrical communication with the first end of the antenna pattern and the second connection pad is in electrical communication with the second end of the antenna pattern, and a plurality of tuning capacitor plates, each of the tuning capacitor plates in electrical communication with the antenna pattern through a tuning capacitor plate connection; providing a bridge circuit assembly including a conductive layer; electrically connecting the first connection pad to the second connection pad through the conductive layer of the bridge circuit assembly; and forming a capacitor, the capacitor including the plurality of tuning capacitor plates and a common capacitor plate, wherein the conductive layer of the bridge circuit assembly forms the common capacitor plate.

In another aspect, the present invention provides a method for fabricating a radio frequency identification tag device by providing a radio frequency identification tag base including a base substrate including first and second major surfaces, and a circuit pattern on the first major surface of the base substrate including an antenna pattern including first and second ends and a plurality of coils, wherein the first end of the antenna pattern is located within an inner space defined by the plurality of coils and the second end of the antenna pattern is located outside of the plurality of coils, a first connection pad and a second connection pad, wherein the first connection pad is in electrical communication with the first end of the antenna pattern and the second connection pad is in electrical communication with the second end of the antenna pattern, and a plurality of tuning capacitor plates, each of the tuning capacitor plates in electrical communication with the antenna pattern through a tuning capacitor plate connection; providing a bridge circuit assembly, the bridge circuit assembly including a bridge substrate including first and second major surfaces, and a conductive layer on the first major surface of the bridge substrate; providing a dielectric layer between the radio frequency identification tag base and the bridge circuit assembly, wherein the conductive layer and plurality of tuning capacitor plates are separated by the dielectric layer; electrically connecting the first connection pad to the second connection pad through the conductive layer of the bridge circuit assembly; forming a capacitor, the capacitor including the plurality of tuning capacitor plates, the dielectric layer, and a common capacitor plate, wherein the conductive layer of the bridge circuit assembly forms the common capacitor plate; measuring a resonant frequency of the device; and selectively severing at least one of the tuning capacitor plate connections.

In another aspect, the present invention provides a radio frequency identification tag device including a radio frequency identification tag base including a base substrate including first and second major surfaces, an antenna pattern including first and second ends and a plurality of coils, wherein the first end of the antenna pattern is located within an inner space defined by the plurality of coils and the second end of the antenna pattern is located outside of the plurality of coils, a first connection pad and a second connection pad, wherein the first connection pad is in electrical communication with the first end of the antenna pattern and the second connection pad is in electrical communication with the second end of the antenna pattern, and a plurality of tuning capacitor plates, each of the tuning capacitor plates in electrical communication with the antenna pattern through a tuning capacitor plate connection; a bridge circuit assembly including a conductive layer; and a capacitor including the plurality of tuning capacitor plates and a common capacitor plate, wherein the conductive layer of the bridge circuit assembly forms the common capacitor plate, and further wherein the first connection pad is electrically connected to the second connection pad through the conductive layer of the bridge circuit assembly.

In another aspect, the present invention provides a radio frequency identification tag device including a radio frequency identification tag base including a base substrate including first and second major surfaces, an antenna pattern including first and second ends and a plurality of coils, wherein the first end of the antenna pattern is located within an inner space defined by the plurality of coils and the second end of the antenna pattern is located outside of the plurality of coils, a first connection pad and a second connection pad, wherein the first connection pad is in electrical communication with the first end of the antenna pattern and the second connection pad is in electrical communication with the second end of the antenna pattern, and a plurality of tuning capacitor plates, each of the tuning capacitor plates in electrical communication with the antenna pattern through a tuning capacitor plate connection; a bridge circuit assembly including a conductive layer; a capacitor including the plurality of tuning capacitor plates, a dielectric layer, and a common capacitor plate, wherein the conductive layer of the bridge circuit assembly forms the common capacitor plate, and further wherein the first connection pad is electrically connected to the second connection pad through the conductive layer of the bridge circuit assembly.

In another aspect, the present invention provides a method for fabricating a radio frequency identification tag device by providing a radio frequency identification tag base including a base substrate including first and second major surfaces, and a circuit pattern on the first major surface of the base substrate, the circuit pattern including an antenna pattern including first and second ends and a plurality of coils, wherein the first end of the antenna pattern is located within an inner space defined by the plurality of coils and the second end of the antenna pattern is located outside of the plurality of coils, a first connection pad and a second connection pad, wherein the first connection pad is in electrical communication with the first end of the antenna pattern and the second connection pad is in electrical communication with the second end of the antenna pattern, and further wherein the first connection pad and the second connection pad define a first axis that intersects both the first and second connection pads, and a plurality of tuning capacitor plates, each of the tuning capacitor plates in electrical communication with the antenna pattern through a tuning capacitor plate connection; providing a bridge circuit assembly having a longitudinal axis, the bridge circuit assembly including a bridge substrate including first and second major surfaces, and a conductive layer on the first major surface of the bridge substrate; providing a dielectric layer between the radio frequency identification tag base and the bridge circuit assembly, wherein the conductive layer and plurality of tuning capacitor plates are separated by the dielectric layer; electrically connecting the first connection pad to the second connection pad through the conductive layer of the bridge circuit assembly; forming a capacitor, the capacitor includes the plurality of tuning capacitor plates, the dielectric layer, and a common capacitor plate, wherein the conductive layer of the bridge circuit assembly forms the common capacitor plate, and further wherein each tuning capacitor plate of the plurality of tuning capacitor plates includes an opposed portion that is directly opposed by the common capacitor; and defining a capacitance for the capacitor by locating the bridge circuit assembly to selectively define the area of the opposed portions of each of the tuning capacitor plates.

In another aspect, the present invention provides a radio frequency identification tag device including a radio frequency identification tag base including a base substrate including first and second major surfaces, an antenna pattern including first and second ends and a plurality of coils, wherein the first end of the antenna pattern is located within an inner space defined by the plurality of coils and the second end of the antenna pattern is located outside of the plurality of coils, a first connection pad and a second connection pad, wherein the first connection pad is in electrical communication with the first end of the antenna pattern and the second connection pad is in electrical communication with the second end of the antenna pattern, and a plurality of tuning capacitor plates, each of the tuning capacitor plates in electrical communication with the antenna pattern through a tuning capacitor plate connection; a bridge circuit assembly including a conductive layer; and a capacitor having a capacitance, the capacitor including the plurality of tuning capacitor plates and a common capacitor plate, wherein the conductive layer of the bridge circuit assembly forms the common capacitor plate, wherein the first connection pad is electrically connected to the second connection pad through the conductive layer of the bridge circuit assembly, and further wherein at least one tuning capacitor plate of the plurality of tuning capacitor plates includes an opposed portion that is directly opposed by the common capacitor and an unopposed portion that is not directly opposed by the common capacitor.

These and other features and advantages of the devices and methods of the present invention may be discussed in more detail below in connection with various illustrative embodiments of the invention.

BRIEF DESCRIPTION OF THE DRAWINGS

FIG. 2b is a cross-sectional view of one embodiment of the bridge circuit assembly of FIG. 2a, taken along line 2—2 in FIG. 2a.

FIG. 6b is a cross-sectional view of the bridge circuit assembly web of FIG. 6a, taken along line 6b—6b in FIG. 6a.

DETAILED DESCRIPTION OF ILLUSTRATIVE EMBODIMENTS OF THE INVENTION

One RFID tag device including a bridge circuit assembly according to the present invention and a method of making the device in accordance with the present invention shall be described. Although the illustrated device may preferably be a resonant radio frequency identification tag, it will be understood that the present invention may be used to manufacture any radio frequency identification tag including an antenna and capacitor as discussed herein.

Figure 1:
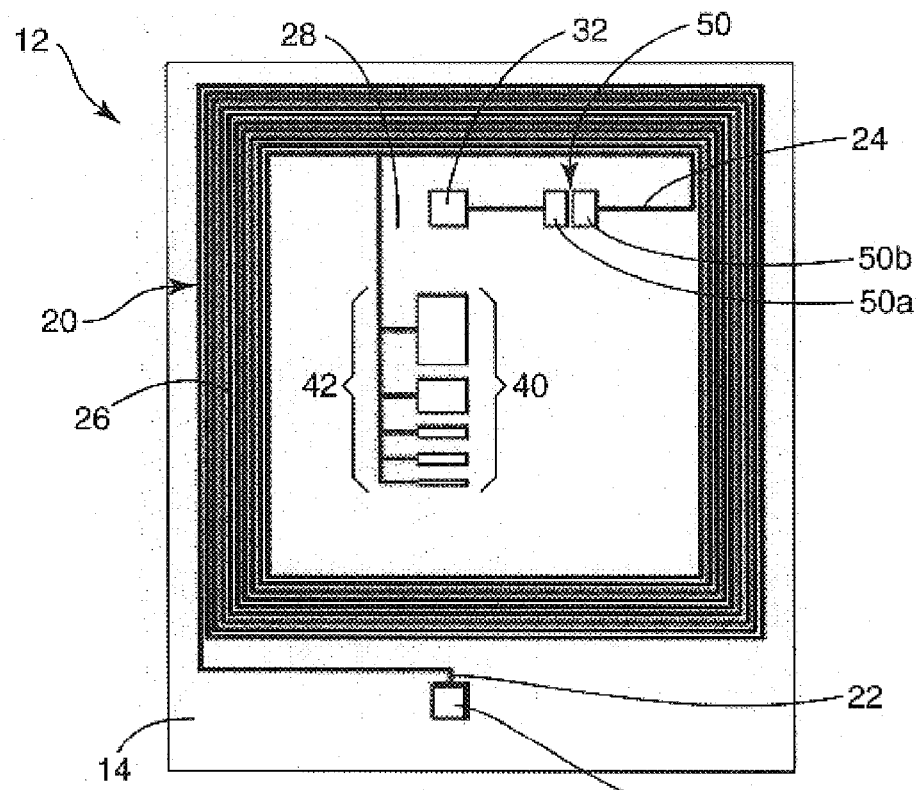
FIG. 1 is a plan view of one device according to the present invention before attachment of a bridge circuit assembly.
Figure 2:
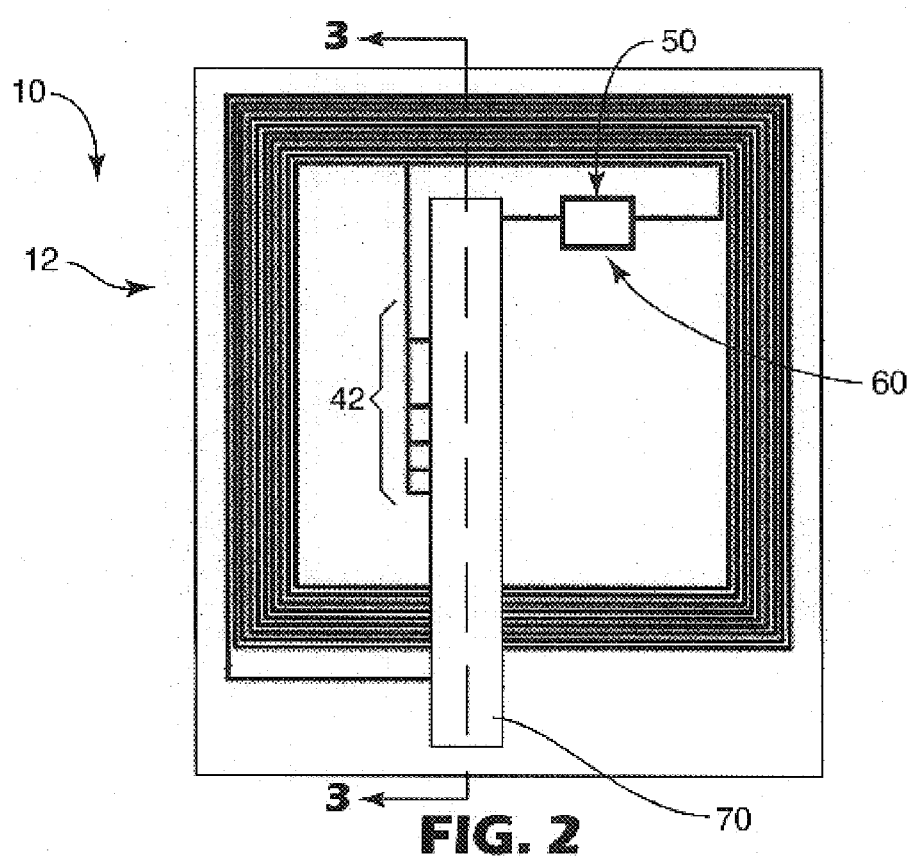
FIG. 2 is a plan view of the device of FIG. 1, with the bridge circuit assembly placed on the RFID base.
Figure 3:
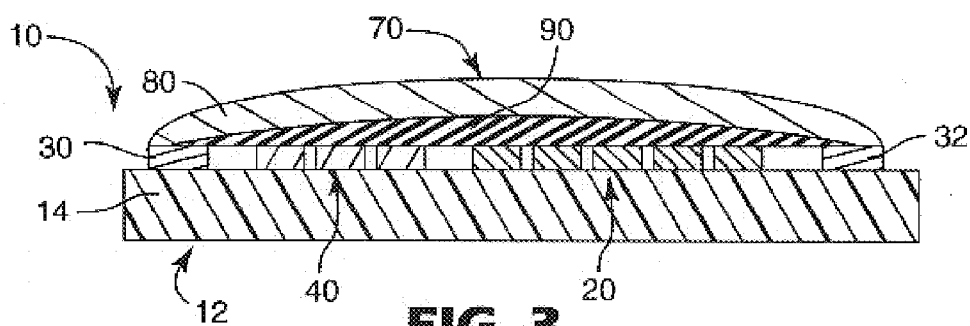
FIG. 3 is a cross-sectional view the device of FIG. 2, taken along line 3—3 in FIG. 2.

With reference to FIGS. 1–3, the device 10 includes an RFID tag base 12 and a bridge circuit assembly 70 placed on the RFID tag base 12. The RFID tag base 12 includes a circuit pattern on a first major surface of a base substrate 14. The circuit pattern includes an antenna 20 having a first end 22 and a second end 24 and a plurality of coils 26. The first end 22 of antenna 20 is located outside of the plurality of coils 26, and the second end of the antenna 24 is located within an inner space 28 defined by the plurality of coils 26.

The circuit pattern of the RFID tag base 12 also includes a first connection pad 30 in electrical communication with the first end 22 of the antenna 20, an optional die connection site 50 in electrical communication with a second end 24 of the antenna 20, and a second connection pad 32 in electrical communication with the die connection site 50 (which would place the second connection pad 32 in electrical communication with the second end 24 of the antenna 20 when an integrated circuit die was provided at the die connection site 50 as discussed more completely below). If the circuit pattern did not include the optional die connection site 50, the second connection pad 32 may be in direct electrical communication with the second end 24 of the antenna 20.

In addition, the circuit pattern also includes a set of tuning capacitor plates 40 in electrical communication with the antenna 20 through tuning capacitor plate connections 42.

All of the components of the circuit pattern are located on the same major surface of the base substrate 14. As a result, vias formed through the base substrate 14 are not required to make the necessary electrical connections between the different components of the circuit pattern. Rather, the connections needed to convert the pattern into a circuit are made by electrically connecting the first connection pad 30 to the second connection pad 32 through the bridge circuit assembly 70.

The base substrate 14 can be manufactured from any suitable material or materials. Suitable materials for base substrate 14 may preferably exhibit certain characteristics. For example, the base substrate 14 may preferably be nonconductive between the various components of the circuit pattern to prevent shorting between them. Examples of suitable substrate materials include, but are not limited to, papers, polymeric materials (e.g., polyethylene, polypropylene, polyesters (e.g., PEN, PET, etc.), polyimides, polyacrylates, polystyrene, etc.), and others. Furthermore, although base substrate 14 is depicted as a homogeneous structure (see FIG. 3), it should be understood that the base substrate 12 may be constructed of two or more different materials provided as different layers or otherwise.

The circuit pattern on RFID tag base 12 may be manufactured utilizing a variety of techniques for forming electrically conductive patterns. The circuit pattern may, for example, be formed using standard printed circuit methods, wherein an original stencil pattern is screen printed with an etch resistant ink onto a metal layer, and the non-ink coated portions are subsequently etched away. Other techniques suitable for providing electrically conductive patterns may similarly be utilized, such as metal foil patterned by photoresist/etch techniques, laser ablation, etc. Another suitable technique may, for example, involve stenciling or printing of conductive ink onto the base substrate 14. In still other techniques, the circuit pattern may be built up by patternwise plating onto, e.g., a metal foil, seed layer, conductive ink layer, etc.

Further, the different components of the circuit pattern may all be manufactured by one technique or, alternatively, two or more different manufacturing techniques may be used to complete a single circuit pattern, with the techniques being selected based on, e.g., the resulting electrical characteristics, resolutions, etc.

The antenna 20 is one component of the circuit pattern located on the first major surface of the base substrate 14 and includes the first and second ends 22 and 24 and the plurality of coils 26. The specific design of the antenna 20 is not critical to the present invention. For example, the number of coils 26 formed in the antenna 20, the spacing between coils 26, the thickness/width of the coils 26, and other design parameters may vary as required to obtain the desired electrical characteristics.

In electrical communication with the antenna 20 is an optional die connection site 50, including die connection terminals 50a and 50b. It should be noted that only those devices 10 that will be used with an integrated circuit die need to include the die connection site 50 as a part of the circuit pattern. Further, as will be discussed in greater detail below, the die connection site 50 may be located on the bridge circuit assembly 70.

The connection terminals 50a and 50b of the die connection site 50 are preferably large enough and in the proper positions to make contact with the terminals on an integrated circuit die to be used in connection with the device 10. Although the depicted die connection site 50 includes two terminals, it will be understood that the die connection site 50 may include any desired number of terminals as required by the integrated circuit die to be attached to the site 50.

In FIG. 2, an integrated circuit die 60 is attached to the die connection site 50. Attaching the die 60 to the die connection site 50 can be accomplished utilizing any suitable technique. For example, the integrated circuit die 60 may be connected using anisotropic conductive adhesives that form vertical connections between the connections on the integrated circuit die 60 and the underlying die connection site 50. In another alternative, the integrated circuit die 60 may be supplied with conductive bumps to penetrate a nonconductive adhesive and make electrical contact with the underlying die connection site 50. The adhesive supplies a mechanical connection between the die 60 and the substrate 14. In yet another alternative, the die 60 may be supplied with solder bumps on its pads. An electrical and mechanical connection is made by reflowing the solder to join the die 60 to the die connection site 50.

Tuning capacitor plates 40 are also located on the same major surface of the base substrate 14, and are in electrical communication with the antenna 20 through tuning capacitor plate connections 42. The plurality of tuning capacitor plates 40 allow for tuning of the resonant frequency of the device 10 by selective severing of the tuning capacitor plate connections 42 as discussed in copending U.S. application Ser. No. 09/776,245, filed Feb. 2, 2001, titled "RFID Tag Device and Method of Manufacture."

The circuit pattern also includes a first connection pad 30 in electrical communication with a first end 22 of the antenna 20, and a second connection pad 32 in electrical communication with a second end 24 of the antenna 20 through die connection site 50. The first connection pad 30 is brought into electrical communication with the second connection pad 32 through the bridge circuit assembly 70.

As illustrated in FIG. 2, the bridge circuit assembly 70 is located on the RFID tag base 12. The bridge circuit assembly 70 is separate and distinct from the RFID tag base 12. In other words, the bridge circuit assembly 70 and the RFID tag base 12 can be separately manufactured and joined together using, e.g., methods further described below or any other suitable methods.

Figure 2A:
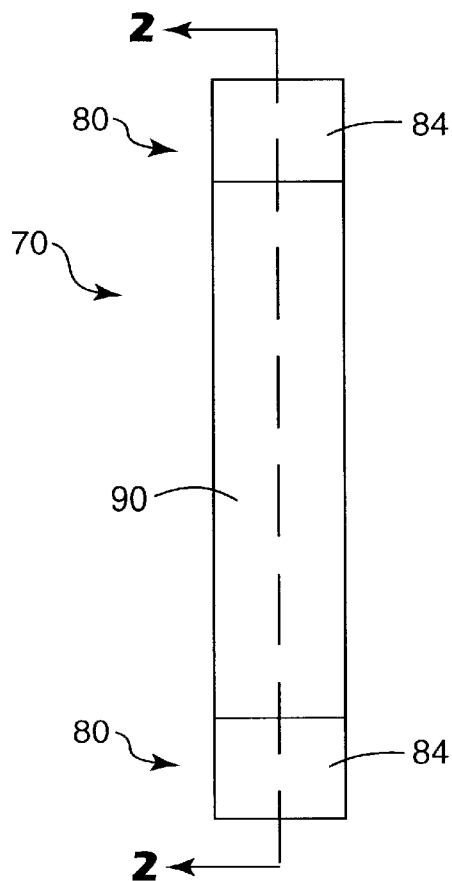
FIG. 2a is a plan view of the surface of the bridge circuit assembly facing the RFID base.
Figure 2B:
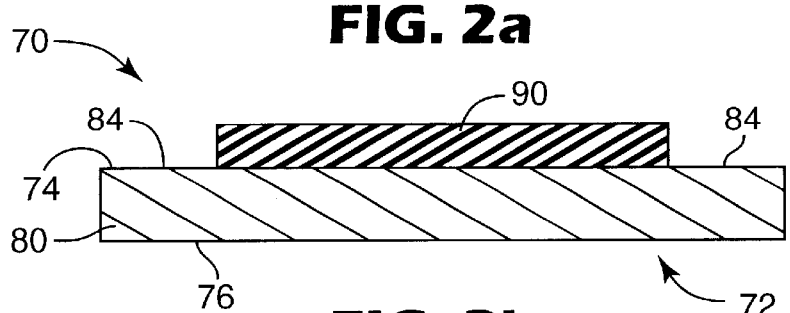

FIG. 2a is a plan view of the surface of the bridge circuit assembly 70 of FIG. 2 that faces the circuit pattern, and FIG. 2b is a cross-sectional view of the bridge circuit assembly 70, taken along line 2—2 in FIG. 2a. As depicted in FIGS. 2a–2b, the bridge circuit assembly 70 includes a bridge substrate 72 having a first major surface 74 and a second major surface 76. The bridge substrate 72 includes a conductive layer 80. A dielectric layer 90 is located on the first major surface 74 of the bridge substrate 72 and placed so that it is positioned over the plurality of tuning capacitor plates 40 when the bridge assembly is placed on the RFID tag base. The dielectric layer is 90 is also placed on the bridge substrate 72 so that portions 84 of the conductive layer 80 are exposed in a configuration whereby they correspond to the first connection pad 30 and second connection pad 32 of the RFID tag base 12 when the bridge assembly 70 is located on the base 12.

As shown in this embodiment of the present invention, the bridge circuit assembly 70 is placed on the RFID tag base 12 such that the first major surface of the base substrate 14 (i.e., the surface on which the circuit pattern is located) faces the first major surface 74 of the bridge substrate 72 of bridge circuit assembly 70. The dielectric layer 90 of the bridge circuit assembly 70 electrically isolates the plurality of tuning capacitor plates 40 of the RFID tag base 12 from the conductive layer 80 of the bridge circuit assembly 70.

The bridge circuit assembly 70 of FIGS. 2a & 2b is one embodiment in which the bridge substrate 72 and the conductive layer 80 are the same article, i.e., the bridge substrate 72 itself functions as the conductive layer 80. In this embodiment, the bridge substrate 72 may be manufactured of any suitable material that offers sufficient structural integrity and electrical conductivity. For example, the bridge circuit assembly substrate/conductive layer 80 may be manufactured of a conductive material, e.g., metallic foil, etc.

Exposed portions 84 of the bridge circuit assembly substrate/conductive layer 80 may be attached to the first connection pad 30 and the second connection pad 32 by any suitable technique, e.g., solder, conductive adhesives, staking etc. Various connection techniques are described in more detail below.

Figure 2C:
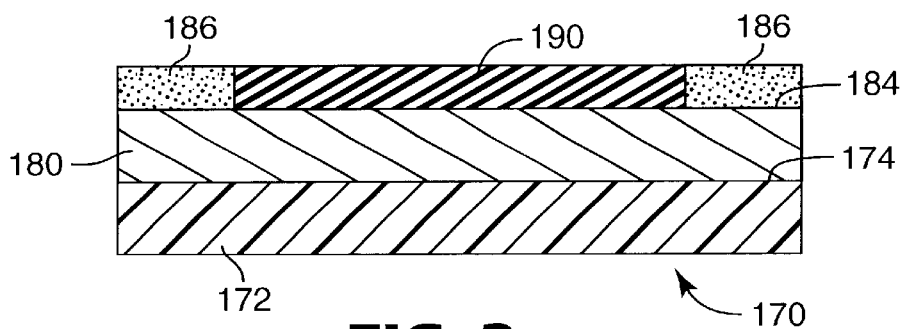
FIG. 2c is a cross-sectional view of an alternative embodiment of the bridge circuit assembly of FIG. 2, taken along line 3—3 in FIG. 2.

FIG. 2c is a cross-sectional view of the bridge circuit assembly 170 of an alternative embodiment of the present invention. Here, bridge circuit assembly 170 includes a non-conductive bridge substrate 172. A conductive layer 180 is located on a first major surface 174 of the bridge substrate 172 and a dielectric layer 190 is located on the conductive layer 180.

The bridge circuit assembly 170 also includes two portions of conductive adhesive 186 located on the exposed portions 184 of the conductive layer 180. The conductive adhesive 186 can be used to attach and electrically connect the conductive layer 180 to the first connection pad 30 and the second connection pad 32 of the base 12.

If as depicted in FIG. 2c, a conductive layer 180 on a nonconductive substrate 172 is utilized, then the conductive layer may be a laminated foil or a deposited film. Examples of suitable substrate materials for substrate 172 include, but are not limited to, papers, polymeric materials (e.g., polyethylene, polypropylene, polyesters (e.g., PEN, PET, etc.), polyimides, polyacrylates, polystyrene, etc.), and others. Although bridge substrate 172 is depicted as a homogeneous structure (see FIG. 2b), it should be understood that the substrate 172 may be constructed of two or more different materials provided as different layers or otherwise. Furthermore, bridge substrate 172 may be manufactured using the same or different materials used to manufacture base substrate 14.

When the bridge circuit assembly 70/170 is placed onto the RFID tag base 12, the conductive layer 80/180 of the bridge circuit assembly 70/170 electrically connects first connection pad 30 with second connection pad 32, thus closing the circuit pattern. The conductive layer 80/180 also acts as a common capacitor plate and forms a capacitor with the plurality of tuning capacitor plates 40 and the dielectric layer 90.

FIG. 3 is a cross-sectional view of the device 10 of FIG. 2 taken along line 3—3 with the embodiment of the bridge circuit assembly 70 depicted in FIG. 2b. In this view, the dielectric layer 90 is located between the conductive layer 80 of bridge circuit assembly 70 and each of the plurality of tuning capacitor plates 40. The dielectric layer 90 also isolates the antenna 20 of the RFID tag base 12 from the conductive layer 80 to prevent shorting of the antenna 20 by the bridge circuit assembly 70. The dielectric layer 90 is depicted as being continuous, although it will be understood that the dielectric layer 90 may be provided only in those areas in which the plurality of tuning capacitor plates 40 and the antenna 20 are located opposite the conductive layer 80 of the bridge circuit assembly 70 (to prevent shorting through the conductive layer 80). Furthermore, although the dielectric layer 90 is depicted as a homogeneous structure, it should be understood that the layer 90 may be constructed of two or more different materials provided as different layers or otherwise.

The dielectric layer 90 can include, but is not limited to, for example, a non-conductive adhesive film, double-sided adhesive tape on a dielectric backing, a coating (e.g., paint, epoxy, solder mask etc.), etc. Preferably, the dielectric layer 90 has a desirable dielectric constant to obtain the required capacitance for the circuit. The dielectric layer 90 may also exhibit sufficient adhesion to maintain the bridge circuit assembly 70 in the connected position.

Although the bridge circuit assembly 70 is depicted as including the dielectric layer 90 before being attached to the base substrate 14, it should be understood that the bridge substrate 72 and dielectric layer 90 may be provided separately. For example, the dielectric layer 90 may be attached to the base substrate 14 alone, followed by attachment of the bridge substrate 72. This variation may also be used in connection with many, if not all, of the bridge circuit assemblies described herein.

After placing the bridge circuit assembly 70 on the RFID tag base 12, the first connection pad 30 and second connection pad 32 are in electrical communication with the conductive layer 80 of the bridge circuit assembly 70. In the depicted embodiment, the electrical connection between the first and second connection pads 30 and 32 and the conductive layer 80 may be accomplished by, e.g., direct contact with each other and both electrically and mechanically joined by an energy-assisted mechanical bond, such as with an ultrasonic or thermosonic probe. Alternatively, the first and second connection pads 30 and 32 may be electrically connected with the conductive layer 80 by any suitable technique known in the art, e.g., a conductive adhesive (e.g., EPOTEK E3116 available from Epoxy Technology, Inc., Billerica, Mass.; 3 M 5303R Z-Axis Adhesive Film available from 3 M Company, St. Paul, Minn.; etc.), a conductive adhesive tape (e.g., 3 M 9703 Electrically Conductive Tape available from 3 M Company), solder, staking, etc.

The bridge circuit assembly of the present invention may be placed on the RFID tag base in a variety of orientations to control the maximum capacitance of the completed RFID tag. By varying the placement of the bridge circuit assembly on the RFID tag base, the effective area of the capacitor formed by the conductive layer of the bridge circuit assembly and the plurality of tuning capacitor plates can be altered, thus changing the maximum capacitance of the RFID tag. In turn, changing the maximum capacitance may provide more control of the resonant frequency of the RFID tag.

Figure 4A:
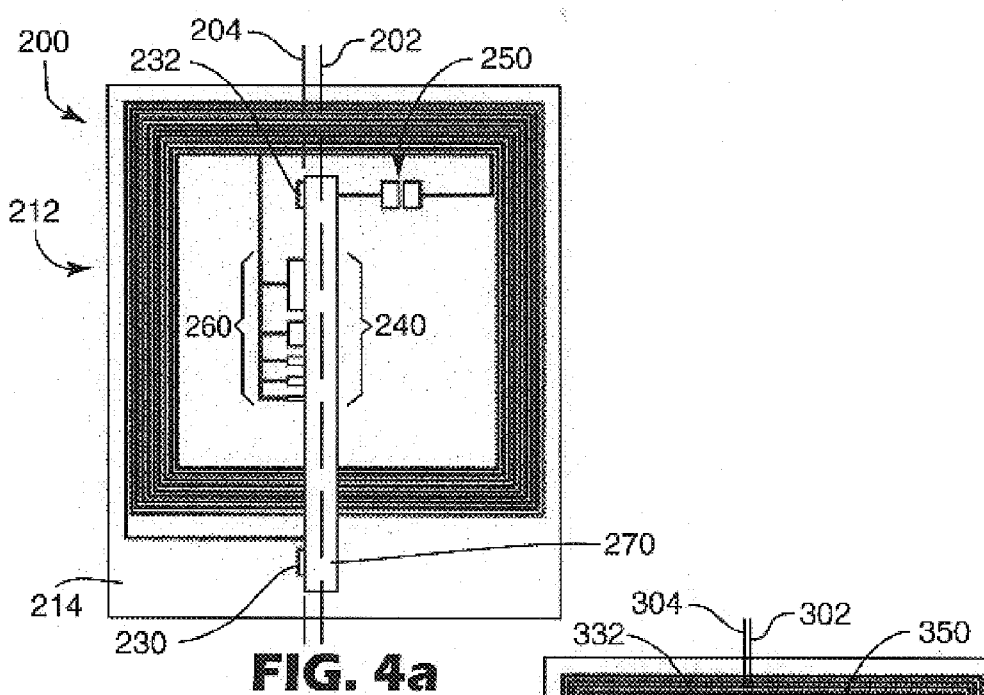
FIG. 4a is a plan view of an alternate embodiment of a device according to the present invention.
Figure 4B:
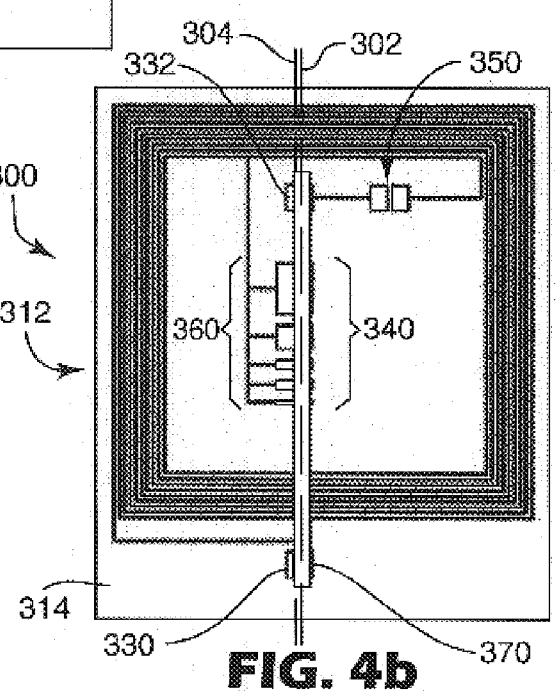
FIG. 4b is a plan view of an alternate embodiment of a device according to the present invention.

FIGS. 4a and 4b illustrate alternative embodiments of the present invention whereby the maximum capacitance is controlled as a function of the effective area of the capacitor. As illustrated in FIG. 4a, a bridge circuit assembly 270 may be located such that a longitudinal axis 202 of the bridge circuit assembly 270 is aligned with a first axis 204 of the RFID tag base 212. The first axis 204 is defined as a line intersecting both first connection pad 230 and second connection pad 232. Although the two axes 202 and 204 are depicted as aligned in FIG. 4a such that they are parallel, it should be understood that the two axes need not be parallel and may be so skewed as to intersect between the two connection pads 230 and 240.

As shown in FIG. 4a, the bridge circuit assembly 270 may oppose a portion of at least one of the plurality of tuning capacitor plates 240 and leave a portion of at least one of the plurality of tuning capacitor plates 240 unopposed. The opposed portion is defined as that portion of at least one of the plurality of tuning capacitor plates 240 that is directly opposed by the common capacitor plate of the bridge circuit assembly 270. Although FIG. 4a depicts at least a portion of each of the plurality of tuning capacitor plates 240 as being opposed, it should be understood that all or only some of the tuning capacitor plates 240 may be directly opposed by the common capacitor plate.

By varying the amount of the opposed portion of the plurality of tuning capacitor plates 240, the maximum capacitance of the completed RFID tag device 200 can be varied. Control over the area of the opposed portions by locating the bridge circuit assembly to selectively define the area of the opposed portions of each of the tuning capacitor plates 240, combined with selectively severing one or more tuning capacitor plate connections 260 as discussed above, allows a full range of circuit capacitance to be selected, ranging from zero (e.g., no opposed portion and all tuning capacitor plate connections severed, etc.), to full design capability (e.g., no unopposed portion and no connections severed).

An alternative embodiment depicting a technique for controlling maximum capacitance of the RFID tag device is depicted in FIG. 4b. As illustrated, bridge circuit assembly 370 may be narrower than a width of at least one tuning capacitor plate of the plurality of tuning capacitor plates 340 (where that width is measured transverse to the first axis 304 extending between the first connection pad 330 and the second connection pad 332).

As long as the bridge circuit assembly 370 is placed such that it overlaps at least a portion of at least one tuning capacitor plate of the plurality of tuning capacitor plates 340 (creating an opposed portion of the plurality of tuning capacitor plates) and electrically connects the first connection pad 330 to the second connection pad 332, the longitudinal axis 302 of the bridge circuit assembly 370 and the first axis 304 of the RFID tag base 312 need not be aligned.

As depicted in FIG. 4b, the bridge circuit assembly 370 has a width (measured transverse to the longitudinal axis 302) that is smaller than the width of the tuning capacitor plates 340. The narrower bridge circuit assembly 370 may reduce the maximum capacitance of the device 300 by decreasing the effective surface area of the capacitor formed by the bridge circuit assembly 370 and the plurality of tuning capacitor plates 340. For example, decreasing the width of the bridge circuit assembly 370 to below the dimensions of the tuning capacitor plates 340 in the same direction decreases the area of the opposed portion of the tuning capacitor plates 340, thus decreasing the effective surface area of the formed capacitor. Conversely, increasing the width of the bridge circuit assembly 370 increases the size of the opposed portion, therefore increasing the effective surface area. Therefore, control over the area of the opposed portions by selecting the width of the bridge circuit assembly 370 to define the area of the opposed portions of each of the tuning capacitor plates 340, combined with selectively severing one or more tuning capacitor plate connections as discussed above, allows a full range of circuit capacitance to be selected, ranging from zero to full design capability. Maximum capacitance of the RFID tag device 300 can be achieved when the width of the assembly 370 is equal to or greater than the maximum width of each of the plurality of tuning capacitor plates 340 and the assembly completely overlaps each of the plurality of tuning capacitor plates 340, therefore eliminating any unopposed portion of the plurality of tuning capacitor plates 340.

Although the bridge circuit assembly 370 is shown as oriented such that its longitudinal axis 302 is substantially parallel to the first axis 304 of the RFID tag base 312, the assembly 370 may be placed such that the longitudinal axis 302 is rotated relative to the first axis 304 to form an angle between the two axes. By rotating the bridge circuit assembly 370, the size of the opposed portion of the plurality of tuning capacitor plates 340 can be decreased, thus decreasing the effective surface area of the formed capacitor and, in turn, the maximum capacitance of the device 300.

Figure 5:
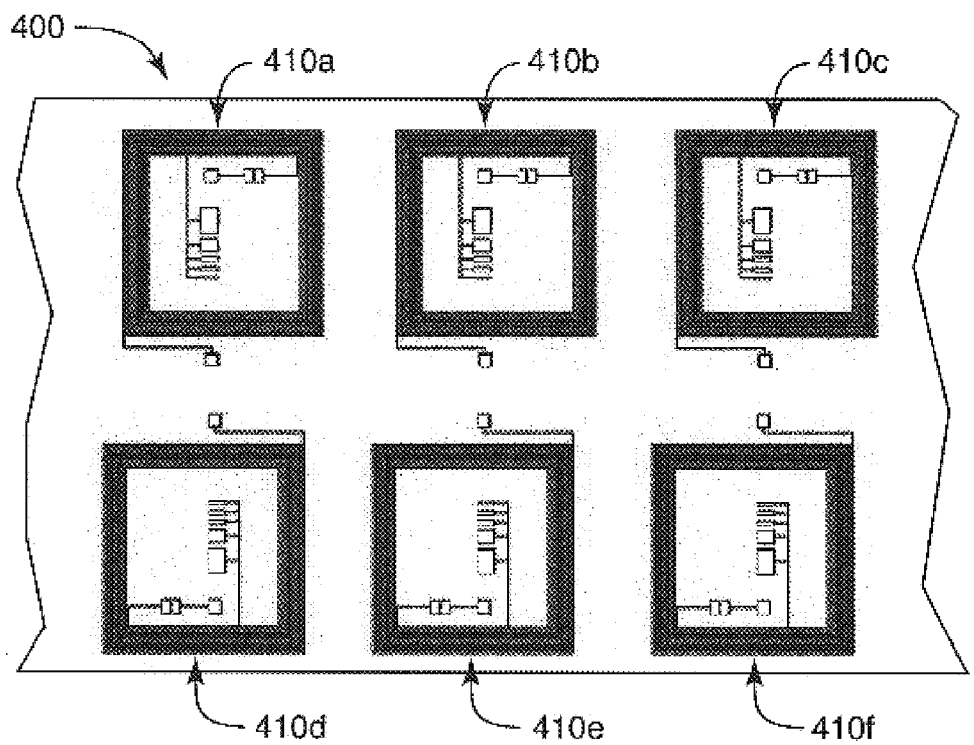
FIG. 5 is a plan view of circuit patterns distributed on a substrate web.
Figure 6:
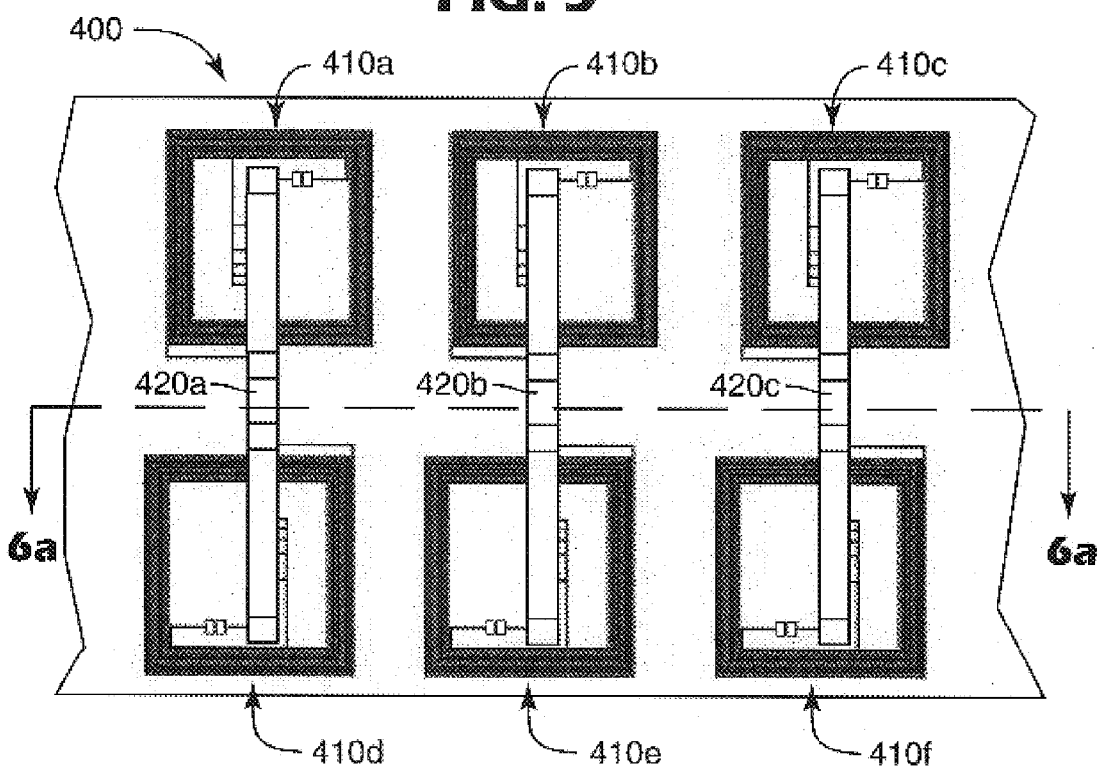
FIG. 6 is a plan view of the substrate web of FIG. 5, with the bridge circuit assemblies placed on the circuit patterns.

FIGS. 5 and 6 illustrate a portion of one method for manufacturing RFID tag devices of the present invention. Here, a substrate web 400 includes a number of circuit patterns 410a–410f (referred to generally as circuit patterns 410) spaced along the length of the web 400 in a two-up configuration. The circuit patterns 410 may preferably include the same components as the individual circuit patterns described above. The web 400 can be separated between adjacent circuit patterns 410 to provide individual radio frequency identification tag devices. Each of the circuit patterns 410 may be completely formed before separation from the web 400. Alternatively, the circuit patterns 410 may be only partially formed before separation from the web 400 (followed by completion of the circuit patterns 410 after separation from the web 400). For example, it may be preferred to separate any integrated die connection pads into die connection terminals before or after separation of the circuit patterns 410 from the web 400. It may also be preferred to locate and attach an integrated circuit die on each of the circuit patterns 410 before separation from the web 400.

The orientation and spacing between the circuit patterns 410 on substrate web 400 are exemplary only. For example, the circuit patterns 410 could be rotated from the orientation depicted in FIG. 5 (which may facilitate roll cutting while in web form), or they could be provided in a single row configuration (one-up) on the substrate web 400, triple row configuration (three-up), etc.

FIG. 6 illustrates the substrate web 400 of FIG. 5 after the bridge circuit assemblies 420a–420c (hereinafter referred to as bridge circuit assemblies 420) have been placed on the circuit patterns 410. Each of the depicted bridge circuit assemblies 420 are sufficiently long and include the proper feature for attachment to two of the circuit patterns 410.

Figure 6A:
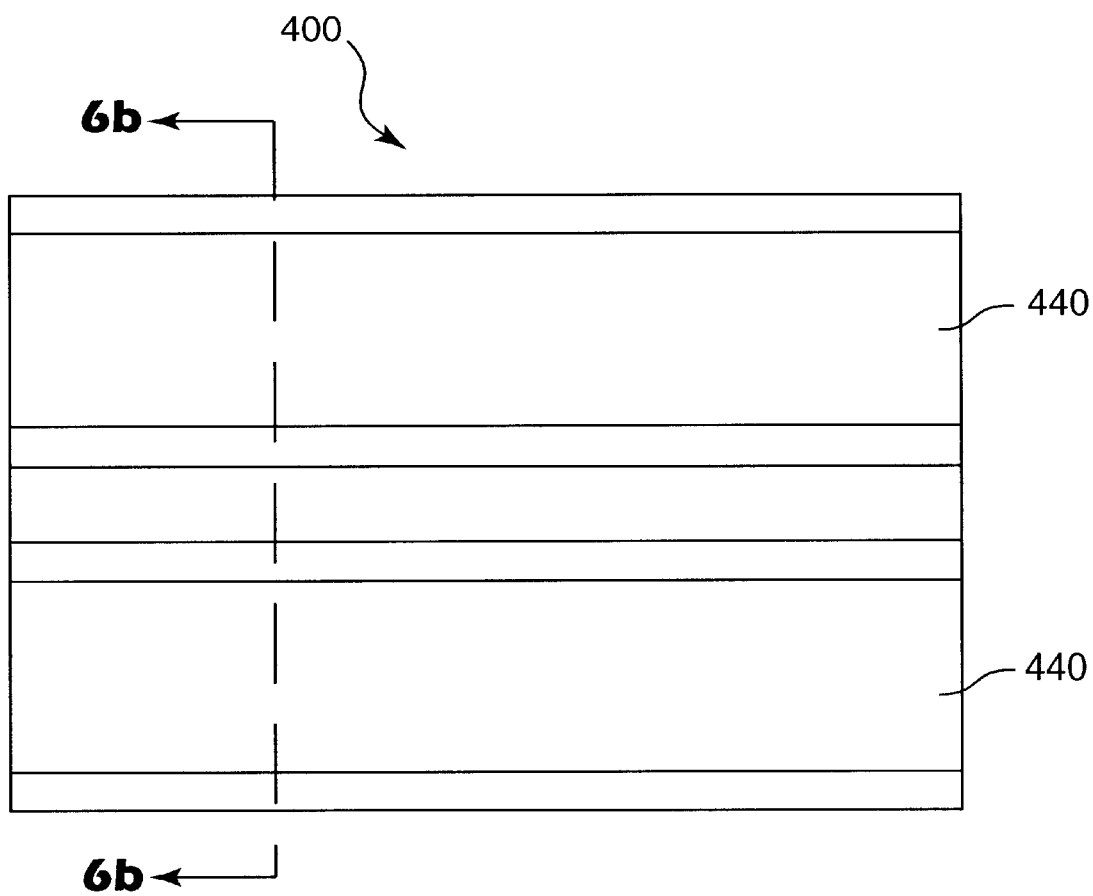
FIG. 6a is a plan view of a web from which bridge circuit assemblies can be manufactured for use with the present invention.

The bridge circuit assemblies 420 may preferably include the same components as the bridge circuit assemblies described above. Here, the bridge circuit assemblies 420 have been separated from a bridge circuit assembly web 422 as depicted in FIG. 6a. The bridge circuit assemblies 420 are preferably of sufficient size to cover the plurality of capacitor plates (e.g., the plurality of capacitor plates 40 of FIG. 1) and electrically connect to the first and second connection pads (e.g., 30 and 32 of FIG. 1).

Figure 6B:
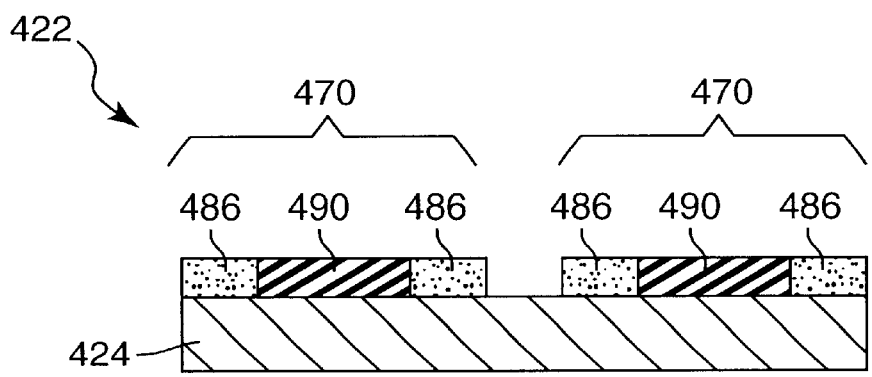

FIG. 6b is a cross-section view of the bridge circuit assembly web 422 of FIG. 6a along line 6b—6b. The bridge circuit assembly web 422 provides two different bridge circuit assemblies 470 provided on a common bridge substrate 424 that, in the depicted embodiment, may itself also provide the desired conductive layer as discussed in connection with the bridge circuit assembly 70 of FIG. 2b. Unlike that embodiment, each of the bridge circuit assemblies 470 also includes a layer of conductive adhesive 486 on each side of dielectric layers 490. The bridge circuit assembly web 422 includes two bridge circuit assemblies 470 that are separated along line 6a—6a when the RFID tags 410 are separated from substrate web 400 (see FIG. 6). The number of bridge circuit assemblies 470 provided across the width of any bridge circuit assembly web 422 may be selected to match the number of circuit patterns arrayed across the width of the substrate web 400.

Figure 7A:
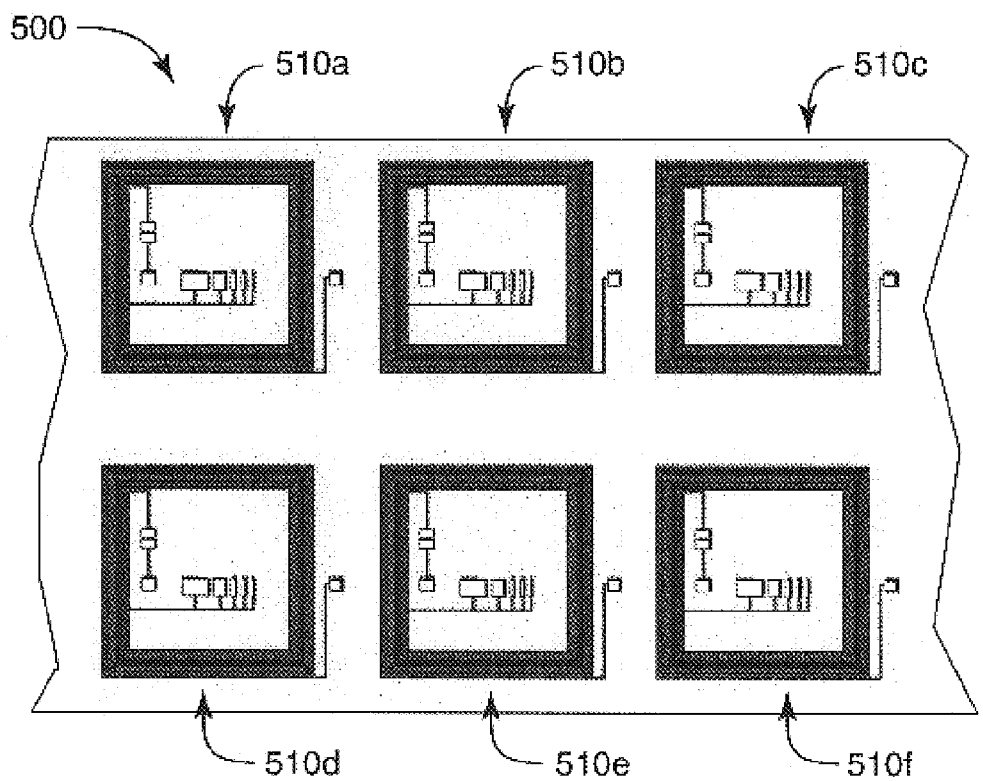
FIG. 7a is a plan view of circuit patterns distributed on a substrate web.
Figure 7B:
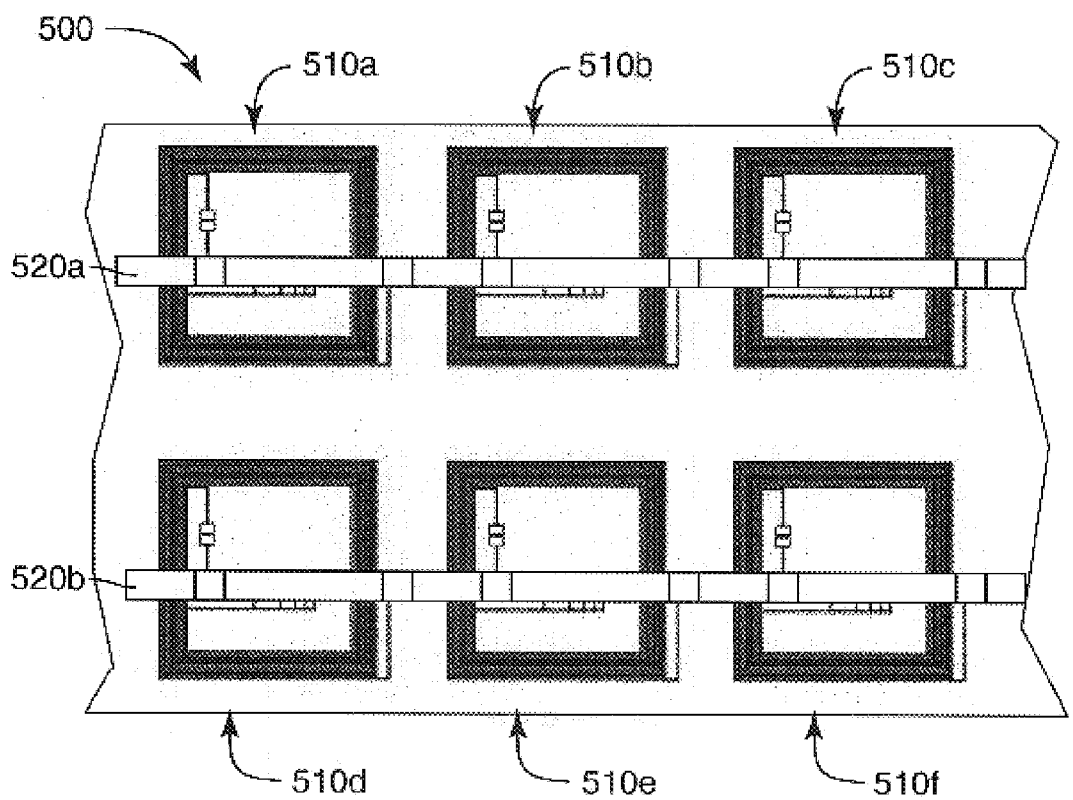
FIG. 7b is a plan view of the substrate web of FIG. 7a with the bridge circuit assemblies placed on the circuit patterns.

As mentioned above, the orientation and spacing between the circuit patterns 410 on substrate web 400 are exemplary only. For example, as illustrated in FIGS. 7a–7b, the circuit patterns 410 could be rotated from the orientation depicted in FIG. 5. As illustrated, circuit patterns 510a–510f have been rotated approximately 90 degrees from their orientation in FIG. 5. In the embodiments illustrated in FIGS. 7a–7b, the centerline of the long axis of the bridge circuit assembly web (not shown) will be parallel to the web centerline. Bridge circuit assemblies 520a–520b may be provided on a continuous web or may be cut apart in to smaller lengths and placed one or more at a time in position on the assembly 500.

FIGS. 8a–8e illustrate alternative embodiments of bridge circuit assemblies 600 according to the present invention. The bridge circuit assembly 600 may be a metal foil (see FIG. 8a), or a conductive layer 630 on a substrate 620 (see FIG. 8b a cross-sectional view). The conductive layer 630 may be manufactured utilizing a variety of techniques for forming electrically conductive patterns. For example, the conductive layer 630 may be laminated foil or deposited film. Similarly, the substrate 620 may be manufactured from any suitable material or materials. Examples of suitable substrate materials include, but are not limited to, papers, polymeric materials (e.g., polyethylene, polypropylene, polyesters (e.g., PEN, PET. etc.), polyimides, polyacrylates, polystyrene, etc.), and others.

Figure 8A:
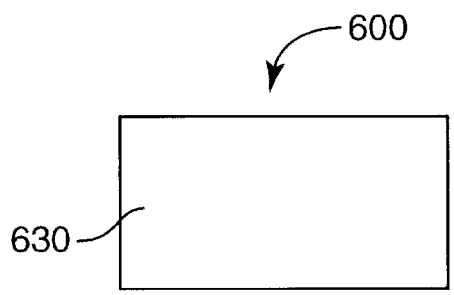
FIGS. 8a–8e are plan views of alternate embodiments of bridge circuit assemblies according to the present invention.
Figure 8B:
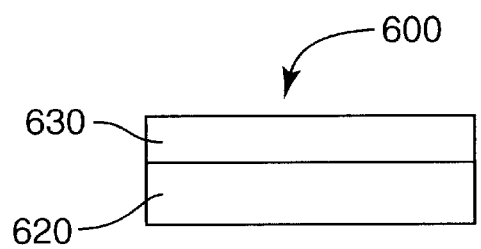
Figure 8C:
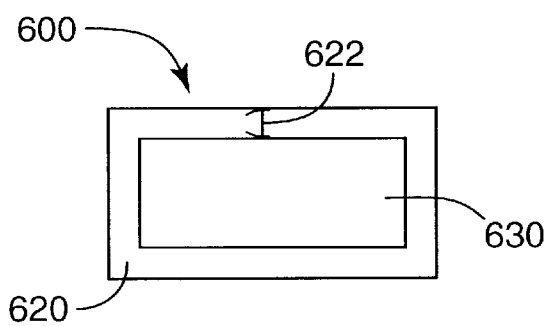

In an alternative embodiment of bridge circuit assembly 600 depicted in FIG. 8c, the assembly 600 includes an edge zone 622 around a periphery of the first major surface of the substrate 620. The edge zone 622 is substantially free of the conductive layer 630, such that when the individual bridge circuit assembly 600 is divided from its web, there are no exposed metal edges, shavings, threads, or "stringers" to short out to the underlying antenna or capacitor structures (see, e.g., antenna 20 and plurality of tuning capacitor plates 40 of FIG. 1).

Figure 8D:
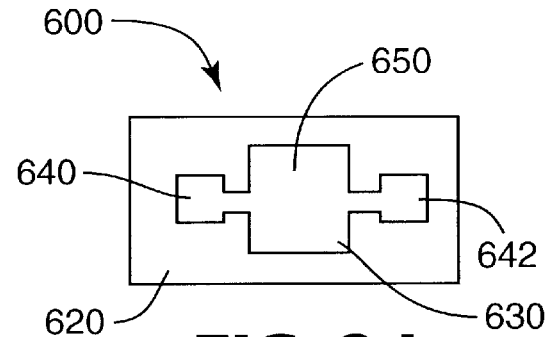

Further, the bridge circuit assembly 600 may be patterned with a first via connection pad 640 and a second via connection pad 642 as depicted in FIG. 8d. FIG. 8d also includes a common capacitor plate 650. The conductive layer 630 of FIG. 8d may be manufactured utilizing a variety of techniques for forming electrically conductive patterns.

Figure 8E:
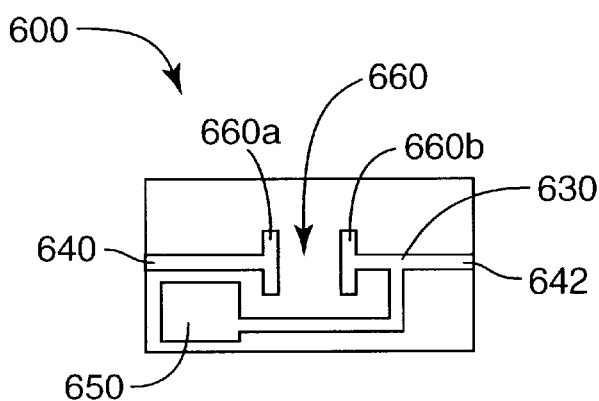

In FIG. 8e, another embodiment of the bridge circuit assembly 600 of the present invention is illustrated. Bridge circuit assembly 600 includes substrate 620 and a conductive layer 630. Conductive layer 630 includes a first via connection pad 640, a second via connection pad 642, a common capacitor plate 650, and a die connection pad 660. The first and second via connection pads 640 and 642 are in electrical communication with the die connection pad 660 and the common capacitor plate 650. Further, the die connection pad 660 is depicted in FIG. 8e as having first and second die connection terminals 660a and 660b respectively.

Figure 9:
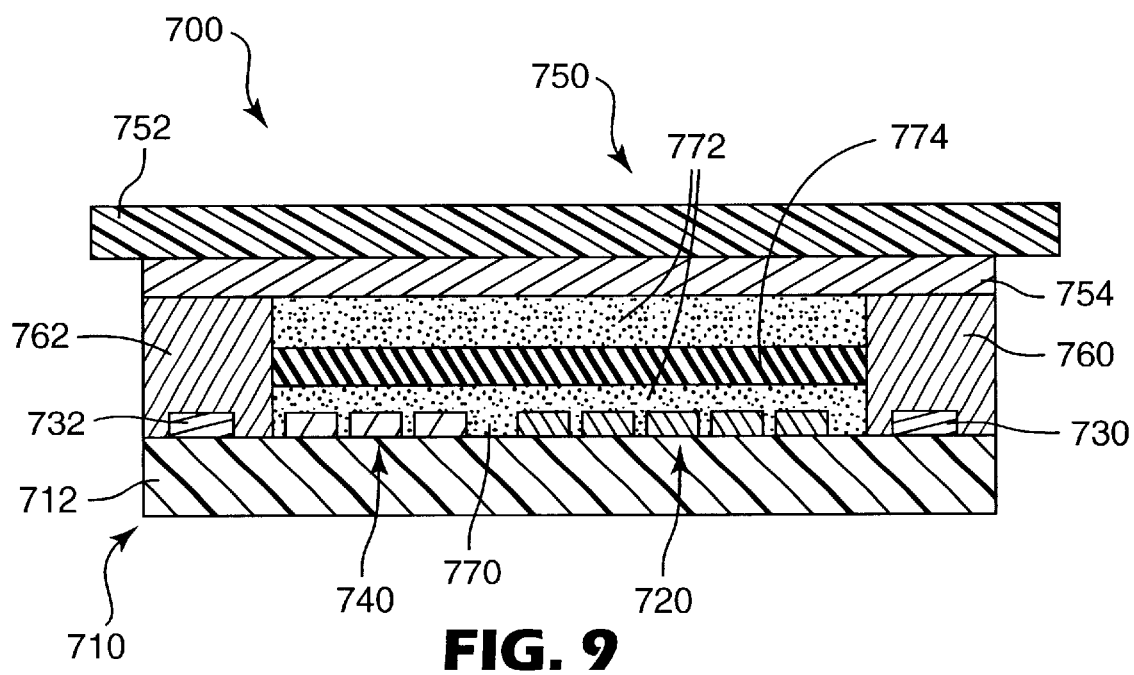
FIG. 9 is a cross-sectional view of an alternate embodiment of a device according to the present invention.

FIG. 9 illustrates an alternative embodiment of the present invention. Here, the RFID tag with bridge circuit assembly device 700 includes an RFID tag base 710 and a bridge circuit assembly 750. The RFID tag base 710 includes a base substrate 712. Patterned on the base substrate 712 are an antenna 720, first and second via connection pads 730 and 732 respectively, and a plurality of tuning capacitor plates 740. The bridge circuit assembly 750 includes a bridge substrate 752 and a conductive layer 754.

The first connection pad 730 of the RFID tag base 710 is electrically connected to the second connection pad 732 through the conductive layer 754 of the bridge circuit assembly 750. To further this electrical connection, a first via connection 760 and a second via connection 762 electrically connect the first and second connection pads 730 and 732 to the conductive layer 754 of the bridge circuit assembly 750. The first and second via connections 760 and 762 may be electrically connected to the conductive layer 754 by any suitable means known in the art, e.g., conductive adhesive, conductive adhesive tape, solder, direct contact, etc.

To prevent the conductive layer 754 of the bridge circuit assembly 750 from contacting the plurality of tuning capacitor plates 740 and antenna 720 of the RFID tag base 710, a dielectric layer 770 is provided between the conductive layer 754 of the bridge circuit assembly 750 and the circuit pattern of the RFID tag base 710. The dielectric layer 770 may be manufactured from any suitable material known in the art. As depicted in FIG. 9, the dielectric layer 770 includes a dielectric backing 774 and dielectric adhesive 772 on both sides of the backing 774.

Figure 10:
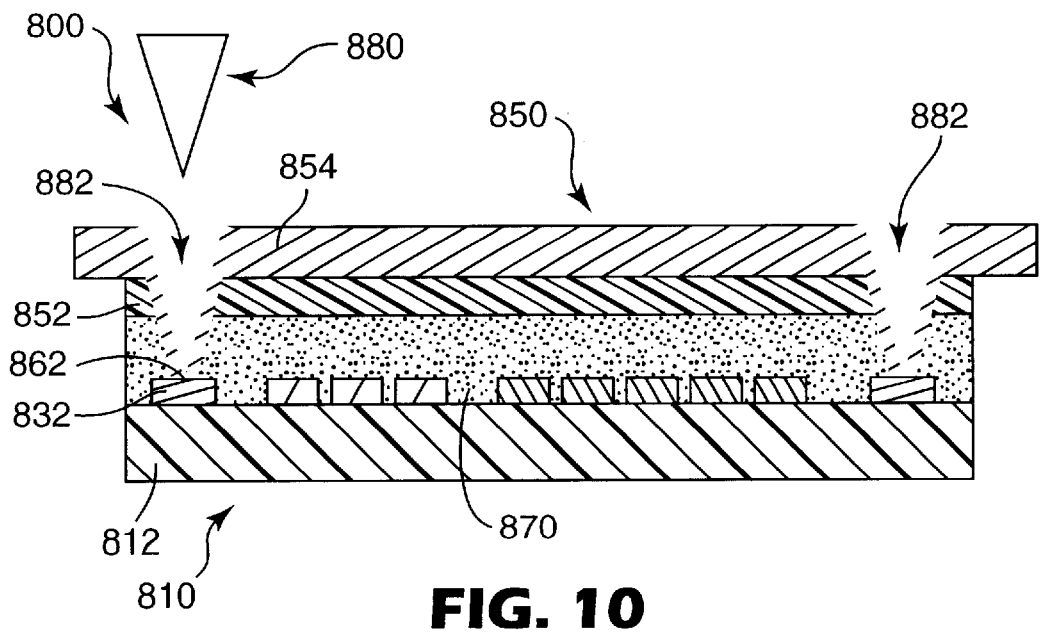
FIG. 10 is a cross-sectional view of one technique for electrically connecting the connection pads in a device according to the present invention.

In an alternative embodiment of the device depicted in FIG. 9, FIG. 10 illustrates an RFID tag with bridge circuit assembly device 800. Unlike the device shown in FIG. 9, the device 800 in FIG. 10 includes a conductive layer 854 of the bridge circuit assembly 850 on the opposing side of the bridge substrate 852 from the RFID tag base 810. Also, the device 800 of FIG. 10 depicts a homogeneous dielectric layer 870, instead of the composite double-sided dielectric adhesive 772 and dielectric backing 774 of FIG. 9.

Connection of the conductive layer 854 of the bridge circuit assembly 850 with the first and second connection pads 830 and 832 of the RFID tag base 810 is made by mechanical deformation of the conductive layer 854 and the dielectric layer 870. This connection may be accomplished by using a staking tool 880 to stake the bridge circuit assembly 850 to the connection pads 830 and 832. The tearing, shearing action of the staking tool 880 forms metal from the conductive layer 854 of the bridge circuit assembly 850 into a staked hole 882. The formed metal makes electrical contact with the first and second connection pads 830 and 832.

Figure 11:
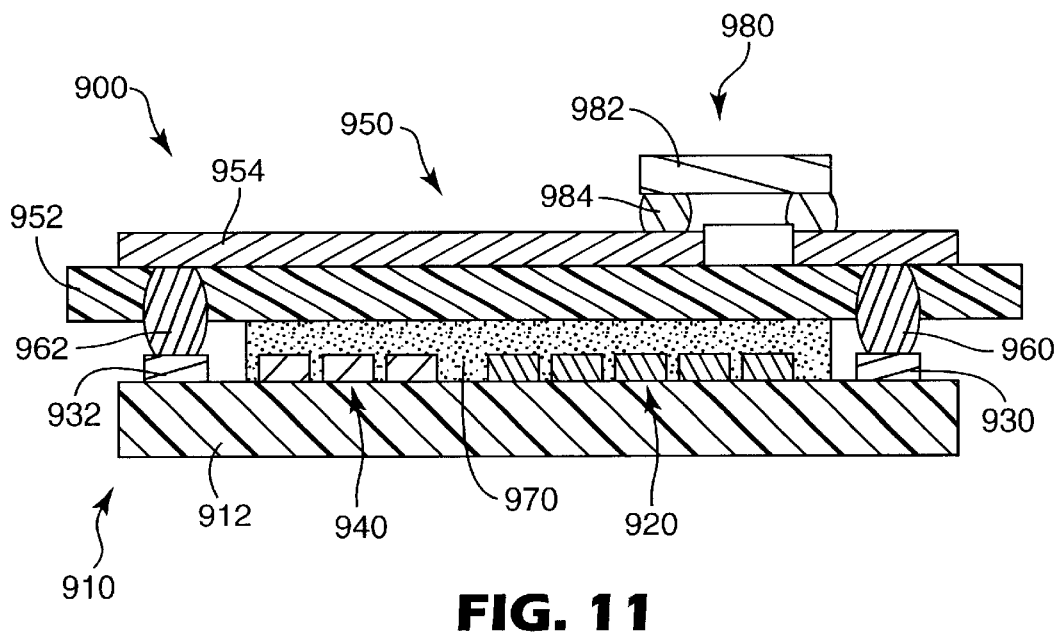
FIG. 11 is a cross-sectional view of an alternate embodiment of a device according to the present invention.
Figure 12:
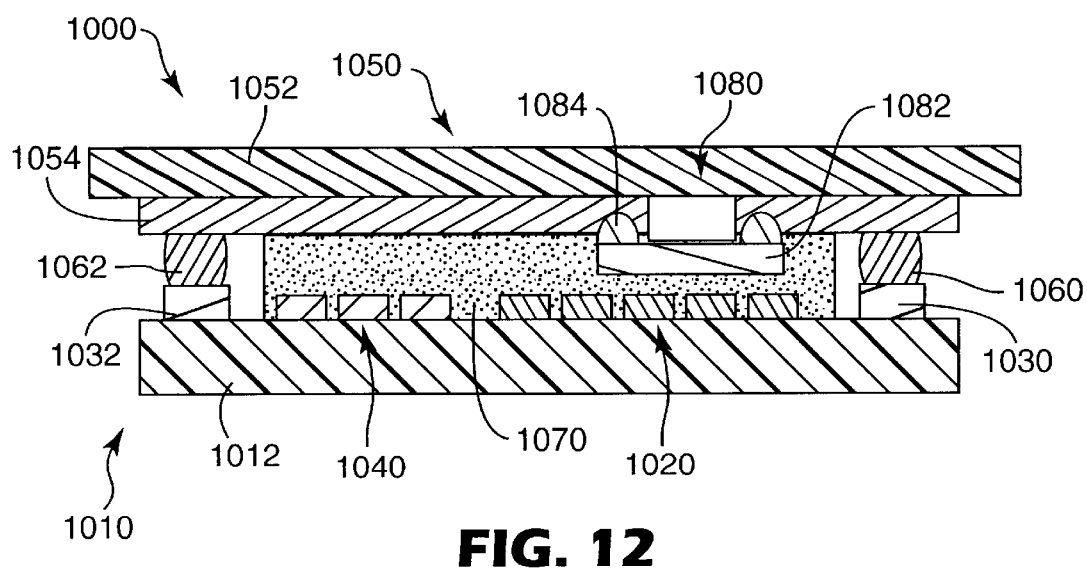
FIG. 12 is a cross-sectional view of an alternate embodiment of a device according to the present invention.

FIGS. 11 and 12 illustrate alternative embodiments of the present invention. In FIG. 11, an RFID tag with bridge circuit assembly device 900 is depicted as including an RFID tag base 910 and a bridge circuit assembly 950. The RFID tag base 910 may include structures similar to embodiments described above. For example, the RFID tag base 910 may include a base substrate 912, first and second connection pads 930 and 932, an antenna 920, and a plurality of tuning capacitor plates 940.

To electrically connect the first connection pad 930 with the second connection pad 932, the bridge circuit assembly 950 is placed on top of the RFID tag base 910. The bridge circuit assembly 950 includes a bridge substrate 952, a conductive layer 954, a common capacitor plate (not shown), and a die assembly 980 electrically connected to the conductive layer 954. The die assembly 980 includes a die 982 and a conductive medium 984 that electrically connects the terminals of the die 982 to the conductive layer 954 of the bridge circuit assembly 950. The conductive medium 984 may be any suitable material known for attaching dies to a substrate, e.g., conductive adhesive, metal, reflowed solder bumps, etc. The conductive layer 954 of the bridge circuit assembly 950 may need to be patterned in any suitable circuit pattern known in the art, the circuit pattern for the bridge circuit assembly 950 may, for example, include the circuit pattern illustrated in FIG. 8e.

To prevent the conductive layer 954 of the bridge circuit assembly 950 from electrically connecting with the plurality of tuning capacitor plates 940 and the antenna 920, a dielectric layer 970 may also be placed between the bridge circuit assembly 950 and the RFID tag base 910. The dielectric layer 970, which can be manufactured from any suitable material known in the art, covers the plurality of tuning capacitor plates 940 and the antenna 920 to prevent a short from occurring and also provides uniform spacing for the capacitor and may be formed with the tuning capacitor plates 940 and the conductive layer 954 on the bridge circuit assembly 950.

Because the conductive layer 954 of the bridge circuit assembly 950 is on the opposite major surface of the bridge substrate 952 as the RFID tag base 910, a first via connection 960 and a second via connection 962 are directed through the bridge substrate 952 of the bridge circuit assembly 950. In other words, the first and second via connections 960 and 962 extend through via holes in the bridge substrate 952 to the conductive layer 954 of the bridge circuit assembly 950, where an electrical connection is made. The first and second via connections 960 and 962 may be manufactured using any suitable material known in art, e.g., metal, solder, conductive adhesive, etc.

Once in place, the common capacitor plate (see, e.g., common capacitor plate 350 of FIG. 8e) forms a capacitor with the plurality of tuning capacitor plates 040 and the dielectric layer 970. A resonant frequency of the device 900 can be tuned by selectively severing connections to the plurality of tuning capacitor plates 940 as described above.

FIG. 12 illustrates another alternative embodiment of the present invention. The RFID tag with bridge circuit assembly device 1000 shown in FIG. 12 is similar in design to the device of FIG. 11. For example, a die assembly 1080 is electrically connected to a conductive layer 1054 of a bridge circuit assembly 1050. Unlike the device illustrated in FIG. 11, the device 1000 of FIG. 12 locates the conductive layer 1054 of the bridge circuit assembly 1050 facing the RFID tag base 1010. Because of this arrangement, there is no need for making via holes through the bridge substrate 1052 to electrically connect the conductive layer 1054 of the bridge circuit assembly 1050 to the first and second connection pads 1030 and 1032 of the RFID tag base 1010. Instead, first and second via connections 1060 and 1062 electrically connect the first and second connection pads 1030 and 1032 together through the conductive layer 1054 of the bridge circuit assembly 1050 without passing through the bridge substrate 1052. An additional advantage of this arrangement is the physical protection afforded to the RFID die assembly 1080, as it is captured in the interior region between the bridge circuit assembly 1050 and the RFID tag base 1010.

A dielectric layer 1070 is located between the bridge circuit assembly 1050 and the RFID tag base 1010. The dielectric layer 1070 not only protects the die assembly 1080 from contact with the RFID tag substrate 1012 and antenna 1020, but it also forms a capacitor along with the conductive layer 1054 of the bridge circuit assembly 1050 and the plurality of tuning capacitor plates 1040.

All patent documents, references, and publications cited herein are expressly incorporated herein by reference in their entirety into this disclosure. Illustrative embodiments of this invention are discussed and reference has been made to possible variations within the scope of this invention. These and other variations and modifications in the invention will be apparent to those skilled in the art without departing from the scope of this invention, and it should be understood that this invention is not limited to the illustrative embodiments set forth herein. Accordingly, the invention is to be limited only by the claims provided below.

What is claimed is:

1. A radio frequency identification tag device comprising:
   a radio frequency identification tag base comprising:
      a base substrate comprising first and second major surfaces;
      an antenna pattern comprising first and second ends and a plurality of coils, wherein the first end of the antenna pattern is located within an inner space defined by the plurality of coils and the second end of the antenna pattern is located outside of the plurality of coils;
      a first connection pad and a second connection pad, wherein the first connection pad is in electrical communication with the first end of the antenna pattern and the second connection pad is in electrical communication with the second end of the antenna pattern; and
      a plurality of severable tuning capacitor plates, each of the tuning capacitor plates in electrical communication with the antenna pattern through a tuning capacitor plate connection;
   a bridge circuit assembly comprising a conductive layer; and
   a capacitor comprising the plurality of severable tuning capacitor plates and a common capacitor plate, wherein the conductive layer of the bridge circuit assembly forms the common capacitor plate, and further wherein the first connection pad is electrically connected to the second connection pad through the conductive layer of the bridge circuit assembly.

2. A device according to claim 1, further comprising adhesive located between the common capacitor plate and each of the tuning capacitor plates.

3. A device according to claim 1, wherein the capacitor further comprises a dielectric layer comprising a backing and adhesive located on each of two major surfaces of the backing.

4. A device according to claim 1, further comprising electrically conductive adhesive between the conductive layer of the bridge circuit assembly and first and second connection pads of the radio frequency identification tag base.

5. A device according to claim 1, further comprising a die connection site located on the first major surface of the base substrate, the die connection site in electrical communication with the antenna.

6. A device according to claim 5, further comprising a die attached to the die connection site.

7. A device according to claim 1, wherein the bridge circuit assembly further comprises a die connection site in electrical communication with the conductive layer of the bridge circuit assembly.

8. A device according to claim 7, further comprising a die attached to the die connection site.

9. A device according to claim 1, further comprising at least one disconnected tuning capacitor plate located opposite the common capacitor plate and separated from the common capacitor plate by a dielectric layer, wherein the disconnected tuning capacitor plate is not in electrical communication with the antenna.

10. A device according to claim 1, wherein the first connection pad and second connection pad are electrically connected to the conductive layer of the bridge circuit assembly through at least two openings in the bridge substrate.

11. A method for fabricating a radio frequency identification tag device, the method comprising:
providing a radio frequency identification tag base comprising a base substrate comprising first and second major surfaces, and a circuit pattern on the first major surface of the base substrate, the circuit pattern comprising:
an antenna pattern comprising first and second ends and a plurality of coils, wherein the first end of the antenna pattern is located within an inner space defined by the plurality of coils and the second end of the antenna pattern is located outside of the plurality of coils;
a first connection pad and a second connection pad, wherein the first connection pad is in electrical communication with the first end of the antenna pattern and the second connection pad is in electrical communication with the second end of the antenna pattern; and
a plurality of tuning capacitor plates, each of the tuning capacitor plates in electrical communication with the antenna pattern through a tuning capacitor plate connection;
providing a bridge circuit assembly, the bridge circuit assembly comprising:
a bridge substrate comprising first and second major surfaces; and
a conductive layer on the first major surface of the bridge substrate;
providing a dielectric layer between the radio frequency identification tag base and the bridge circuit assembly, wherein the conductive layer and plurality of tuning capacitor plates are separated by the dielectric layer;
electrically connecting the first connection pad to the second connection pad through the conductive layer of the bridge circuit assembly;
forming a capacitor, the capacitor comprising the plurality of tuning capacitor plates, the dielectric layer, and a common capacitor plate, wherein the conductive layer of the bridge circuit assembly forms the common capacitor plate;
measuring a resonant frequency of the device; and
selectively severing at least one of the tuning capacitor plate connections.

12. A radio frequency identification tag device comprising:
a radio frequency identification tag base comprising:
a base substrate comprising first and second major surfaces;
an antenna pattern comprising first and second ends and a plurality of coils, wherein the first end of the antenna pattern is located within an inner space defined by the plurality of coils and the second end of the antenna pattern is located outside of the plurality of coils;
a first connection pad and a second connection pad, wherein the first connection pad is in electrical communication with the first end of the antenna pattern and the second connection pad is in electrical communication with the second end of the antenna pattern; and
a plurality of severable tuning capacitor plates, each of the tuning capacitor plates in electrical communication with the antenna pattern through a tuning capacitor plate connection;
a bridge circuit assembly comprising a conductive layer;
a capacitor comprising the plurality of severable tuning capacitor plates, a dielectric layer, and a common capacitor plate, wherein the conductive layer of the bridge circuit assembly forms the common capacitor plate, and further wherein the plurality of severable tuning capacitor plates and the common capacitor plate are separated by the dielectric layer; and
at least one disconnected tuning capacitor plate located opposite the common capacitor plate and separated from the common capacitor plate by the dielectric layer, wherein the disconnected tuning capacitor plate is not in electrical communication with the antenna, and further wherein the first connection pad is electrically connected to the second connection pad through the conductive layer of the bridge circuit assembly.

13. A method for fabricating a radio frequency identification tag device, the method comprising:
providing a base substrate comprising first and second major surfaces;
providing a circuit pattern on the first major surface of the base substrate, the circuit pattern comprising:
an antenna pattern comprising first and second ends and a plurality of coils, wherein the first end of the antenna pattern is located within an inner space defined by the plurality of coils and the second end of the antenna pattern is located outside of the plurality of coils;
a first connection pad and a second connection pad, wherein the first connection pad is in electrical communication with the first end of the antenna pattern and the second connection pad is in electrical communication with the second end of the antenna pattern; and a plurality of severable tuning capacitor plates, each of the tuning capacitor plates in electrical communication with the antenna pattern through a tuning capacitor plate connection;

providing a bridge circuit assembly comprising a conductive layer;

electrically connecting the first connection pad to the second connection pad through the conductive layer of the bridge circuit assembly; and forming a capacitor, the capacitor comprising the plurality of severable tuning capacitor plates and a common capacitor plate, wherein the conductive layer of the bridge circuit assembly forms the common capacitor plate.

14. A method according to claim 13, wherein the bridge circuit assembly traverses the plurality of coils between the first end and the second end of the antenna pattern above the first major surface of the base substrate.

15. A method according to claim 13, wherein the bridge circuit assembly further comprises a bridge substrate having a first major surface and a second major surface, wherein the conductive layer is located on the first major surface of the bridge substrate.

16. A method according to claim 15, further comprising:
locating the bridge circuit assembly such that the second major surface of the bridge substrate faces the first major surface of the base substrate; and
providing a first and second via connection through the bridge substrate, wherein the first and second via connection electrically connect the first connection pad and the second connection pad to the conductive layer of the bridge circuit assembly.

17. A method according to claim 15, wherein the bridge circuit assembly further comprises an edge zone on the first major surface of the bridge substrate, wherein the edge zone comprises an area around a periphery of the first major surface of the substrate, and further wherein the edge zone is substantially free of the conductive layer.

18. A method according to claim 15, wherein the bridge circuit assembly further comprises a die connection site on the first major surface of the bridge substrate, the die connection site in electrical communication with the conductive layer of the bridge circuit assembly.

19. A method according to claim 18, further comprising attaching a die to the die connection site.

20. A method according to claim 18, wherein the die connection site comprises an integrated die connection pad, and wherein the method further comprises separating the die connection site into a plurality of die connection terminals.

21. A method according to claim 13, further comprising:
measuring a resonant frequency of the device; and
selectively severing at least one of the tuning capacitor plate connections.

22. A method according to claim 13, wherein the circuit pattern further comprises a die connection site on the first major surface of the base substrate, the die connection site in electrical communication with the antenna pattern.

23. A method according to claim 22, further comprising attaching a die to the die connection site.

24. A method according to claim 22, wherein the die connection site comprises an integrated die connection pad, and wherein the method further comprises separating the die connection site into a plurality of die connection terminals.

25. A method according to claim 13, further comprising providing a dielectric layer between the common capacitor plate and each of the tuning capacitor plates.

26. A method according to claim 25, wherein the dielectric layer comprises an adhesive.

27. A method according to claim 25, wherein the dielectric layer comprises a backing and adhesive located on each of two major surfaces of the backing.

28. A method according to claim 13, further comprising providing an electrically conductive material between the first and second connection pads and the bridge circuit assembly.

29. A method according to claim 28, wherein the electrically conductive material comprises electrically conductive adhesive.

30. A method according to claim 13, wherein providing a base substrate further comprises providing a substrate web comprising a plurality of circuit patterns.

31. A method according to claim 30, further comprising separating the substrate web between adjacent circuit patterns.

32. A method for fabricating a radio frequency identification tag device, the method comprising:
providing a radio frequency identification tag base comprising a base substrate comprising first and second major surfaces, and a circuit pattern on the first major surface of the base substrate, the circuit pattern comprising:
an antenna pattern comprising first and second ends and a plurality of coils, wherein the first end of the antenna pattern is located within an inner space defined by the plurality of coils and the second end of the antenna pattern is located outside of the plurality of coils;
a first connection pad and a second connection pad, wherein the first connection pad is in electrical communication with the first end of the antenna pattern and the second connection pad is in electrical communication with the second end of the antenna pattern, and further wherein the first connection pad and the second connection pad define a first axis that intersects both the first and second connection pads; and
a plurality of severable tuning capacitor plates, each of the tuning capacitor plates in electrical communication with the antenna pattern through a tuning capacitor plate connection;
providing a bridge circuit assembly having a longitudinal axis, the bridge circuit assembly comprising:
a bridge substrate comprising first and second major surfaces; and
a conductive layer on the first major surface of the bridge substrate;
providing a dielectric layer between the radio frequency identification tag base and the bridge circuit assembly, wherein the conductive layer and plurality of tuning capacitor plates are separated by the dielectric layer;
electrically connecting the first connection pad to the second connection pad through the conductive layer of the bridge circuit assembly;
forming a capacitor, the capacitor comprising the plurality of severable tuning capacitor plates, the dielectric layer, and a common capacitor plate, wherein the conductive layer of the bridge circuit assembly forms the common capacitor plate, and further wherein each tuning capacitor plate of the plurality of tuning capacitor plates comprises an opposed portion that is directly opposed by the common capacitor; and defining a capacitance for the capacitor by locating the bridge circuit assembly to selectively define the area of the opposed portions of each of the tuning capacitor plates.

33. A method according to claim 32, wherein the bridge circuit assembly comprises a width transverse to the longitudinal axis, and further wherein defining a capacitance for the capacitor comprises selecting the width of the bridge circuit assembly.

34. A method according to claim 32, wherein the bridge circuit assembly traverses the plurality of coils between the first end and the second end of the antenna pattern above the first major surface of the base substrate.

35. A method according to claim 32, wherein the bridge circuit assembly further comprises a bridge substrate having a first major surface and a second major surface, wherein the conductive layer is located on the first major surface of the bridge substrate.

36. A method according to claim 35, further comprising:
locating the bridge circuit assembly such that the second major surface of the bridge substrate faces the first major surface of the base substrate; and
providing a first and second via connection through the bridge substrate, wherein the first and second via connection electrically connect the first connection pad and the second connection pad to the conductive layer of the bridge circuit assembly.

37. A method according to claim 35, wherein the bridge circuit assembly further comprises an edge zone on the first major surface of the bridge substrate, wherein the edge zone comprises an area around a periphery of the first major surface of the substrate, and further wherein the edge zone is substantially free of the conductive layer.

38. A method according to claim 35, wherein the bridge circuit assembly further comprises a die connection site on the first major surface of the bridge substrate, the die connection site in electrical communication with the conductive layer of the bridge circuit assembly.

39. A method according to claim 38, further comprising attaching a die to the die connection site.

40. A method according to claim 38, wherein the die connection site comprises an integrated die connection pad, and wherein the method further comprises separating the die connection site into a plurality of die connection terminals.

41. A method according to claim 32, further comprising:
measuring a resonant frequency of the device; and
selectively severing at least one of the tuning capacitor plate connections.

42. A method according to claim 32, wherein the circuit pattern further comprises a die connection site on the first major surface of the base substrate, the die connection site in electrical communication with the antenna pattern.

43. A method according to claim 42, further comprising attaching a die to the die connection site.

44. A method according to claim 42, wherein the die connection site comprises an integrated die connection pad, and wherein the method further comprises separating the die connection site into a plurality of die connection terminals.

45. A method according to claim 32, further comprising providing a dielectric layer between the common capacitor plate and each of the tuning capacitor plates.

46. A method according to claim 45, wherein the dielectric layer comprises an adhesive.

47. A method according to claim 45, wherein the dielectric layer comprises a backing and adhesive located on each of two major surfaces of the backing.

48. A method according to claim 32, further comprising providing an electrically conductive material between the first and second connection pads and the bridge circuit assembly.

49. A method according to claim 48, wherein the electrically conductive material comprises electrically conductive adhesive.

50. A method according to claim 32, wherein providing a base substrate further comprises providing a substrate web comprising a plurality of circuit patterns.

51. A method according to claim 50, further comprising separating the substrate web between adjacent circuit patterns.

52. A radio frequency identification tag device comprising:
a radio frequency identification tag base comprising:
a base substrate comprising first and second major surfaces;
an antenna pattern comprising first and second ends and a plurality of coils, wherein the first end of the antenna pattern is located within an inner space defined by the plurality of coils and the second end of the antenna pattern is located outside of the plurality of coils;
a first connection pad and a second connection pad, wherein the first connection pad is in electrical communication with the first end of the antenna pattern and the second connection pad is in electrical communication with the second end of the antenna pattern; and
a plurality of severable tuning capacitor plates, each of the tuning capacitor plates in electrical communication with the antenna pattern through a tuning capacitor plate connection;
a bridge circuit assembly comprising a conductive layer; and
a capacitor having a capacitance, the capacitor comprising the plurality of severable tuning capacitor plates and a common capacitor plate, wherein the conductive layer of the bridge circuit assembly forms the common capacitor plate, wherein the first connection pad is electrically connected to the second connection pad through the conductive layer of the bridge circuit assembly, and further wherein at least one tuning capacitor plate of the plurality of tuning capacitor plates comprises an opposed portion that is directly opposed by the common capacitor and an unopposed portion that is not directly opposed by the common capacitor.

53. A device according to claim 52, further comprising adhesive located between the common capacitor plate and each of the tuning capacitor plates.

54. A device according to claim 52, wherein the capacitor further comprises a dielectric layer comprising a backing and adhesive located on each of two major surfaces of the backing.

55. A device according to claim 52, further comprising electrically conductive adhesive between the conductive layer of the bridge circuit assembly and first and second connection pads of the radio frequency identification tag base.

56. A device according to claim 52, further comprising a die connection site located on the first major surface of the base substrate, the die connection site in electrical communication with the antenna.

57. A device according to claim 56, further comprising a die attached to the die connection site.

58. A device according to claim 52, wherein the bridge circuit assembly further comprises a die connection site in electrical communication with the conductive layer of the bridge circuit assembly.

59. A device according to claim 58, further comprising a die attached to the die connection site.

60. A device according to claim 52, further comprising at least one disconnected tuning capacitor plate located opposite the common capacitor plate and separated from the common capacitor plate by a dielectric layer, wherein the disconnected tuning capacitor plate is not in electrical communication with the antenna.

61. A device according to claim 52, wherein the first connection pad and second connection pad are electrically connected to the conductive layer of the bridge circuit assembly through at least two openings in the bridge substrate.

* * * * *

UNITED STATES PATENT AND TRADEMARK OFFICE
CERTIFICATE OF CORRECTION

PATENT NO. : 6,693,541 B2
DATED : February 17, 2004
INVENTOR(S) : Egbert, William C.

It is certified that error appears in the above-identified patent and that said Letters Patent is hereby corrected as shown below:

<u>Title page,</u>
Item [56], References Cited, FOREIGN PATENT DOCUMENTS, "FR 2 803 439 7/2001" should read -- FR 2 803 437 7/2001 --

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,693,541 B2
DATED : February 17, 2004
INVENTOR(S) : Egbert, William C.

It is certified that error appears in the above-identified patent and that said Letters Patent is hereby corrected as shown below:

Title page,
Item [73], Assignee, please list -- 3M Innovative Properties Company -- as the Assignee.

Signed and Sealed this

Seventh Day of September, 2004

JON W. DUDAS
*Director of the United States Patent and Trademark Office*